(12) United States Patent
Purkayastha et al.

(10) Patent No.: US 11,711,793 B2
(45) Date of Patent: Jul. 25, 2023

(54) BEAM SELECTION FOR INITIATING RANDOM ACCESS DURING CONDITIONAL HANDOVER EXECUTION

(71) Applicant: QUALCOMM Incorporated, San Diego, CA (US)

(72) Inventors: Punyaslok Purkayastha, San Diego, CA (US); Karthika Paladugu, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 16/910,604

(22) Filed: Jun. 24, 2020

(65) Prior Publication Data

US 2020/0413392 A1 Dec. 31, 2020

Related U.S. Application Data

(60) Provisional application No. 62/867,115, filed on Jun. 26, 2019.

(51) Int. Cl.
*H04W 72/044* (2023.01)
*H04W 36/08* (2009.01)
(Continued)

(52) U.S. Cl.
CPC ......... *H04W 72/046* (2013.01); *H04W 36/08* (2013.01); *H04W 36/30* (2013.01); *H04W 72/02* (2013.01); *H04W 74/0833* (2013.01)

(58) Field of Classification Search
CPC ..... H04W 36/08; H04W 36/30; H04W 72/02; H04W 74/0833; H04W 72/046
See application file for complete search history.

(56) References Cited

U.S. PATENT DOCUMENTS

2020/0154326 A1* 5/2020 Deenoo ................. H04W 36/08
2020/0314913 A1* 10/2020 Rastegardoost ...... H04W 74/04
(Continued)

FOREIGN PATENT DOCUMENTS

WO WO-2019098910 A1 5/2019

OTHER PUBLICATIONS

R2-1906218 Ericsson "On FR2 impacton CHO" 3GPP WG2#106 Reno May 13-17, 2019 (Year: 2019).*
(Continued)

*Primary Examiner* — Basil Ma
(74) *Attorney, Agent, or Firm* — Holland & Hart LLP

(57) ABSTRACT

Conditional handover (CHO) configurations may include random access channel (RACH) configuration information (e.g., beam quality thresholds, beam quality threshold offsets, one or more beams associated with configured contention free random access (CFRA) resources, one or more beams associated with configured contention based random access (CBRA) resources, or some combination thereof). A user equipment (UE) may, upon detection that a handover condition in a CHO configuration has been satisfied, select a target cell beam for transmission of a random access request based on the RACH configuration information included in the CHO configuration. In various examples, the selected beam may correspond to a highest quality beam with a highest quality beam measurement value above the beam quality threshold, a beam with an earliest configured CFRA resource or an earliest configured CBRA resource (e.g., if a corresponding beam measurement at least falls within the beam quality threshold offset), etc.

32 Claims, 18 Drawing Sheets

(51) Int. Cl.
  *H04W 72/02*   (2009.01)
  *H04W 74/08*   (2009.01)
  *H04W 36/30*   (2009.01)

(56) References Cited

U.S. PATENT DOCUMENTS

| | | | | |
|---|---|---|---|---|
| 2020/0351954 | A1* | 11/2020 | Turtinen | H04B 7/088 |
| 2020/0374960 | A1* | 11/2020 | Deenoo | H04W 74/0833 |
| 2021/0345191 | A1* | 11/2021 | Da Silva | H04W 36/0058 |
| 2022/0007261 | A1* | 1/2022 | Kim | H04B 7/0695 |

OTHER PUBLICATIONS

"3rd Generation Partnership Project, Technical Specification Group Radio Access Network NR, Medium Access Control (MAC) protocol specification (Release 15)", 3GPP Standard, Technical Specification, 3GPP TS 38.321, 3rd Generation Partnership Project (3GPP), Mobile Competence Centre, 650, Route Des Lucioles, F-06921 Sophia-Antipolis Cedex, France, vol. RAN WG2, No. V15.5.0, Apr. 9, 2019 (Apr. 9, 2019), pp. 1-78, XP051723351, [retrieved on Apr. 9, 2019] section 1 section 5.1,section 5.1.2.

"3rd Generation Partnership Project; Technical Specification Group Radio Access Network; NR; Radio Resource Control (RRC) Protocol Specification (Release 15)", 3GPP Draft, DRAFT_38331-F60, 3rd Generation Partnership Project (3GPP), Mobile Competence Centre, 650, Route Des Lucioles, F-06921, Sophia-Antipolis Cedex, France, vol. RAN WG2, Jun. 22, 2019 (Jun. 22, 2019), XP051751335, pp. 1-517, Retrieved from the Internet: URL: http://www.3gpp.org/ftp/tsg%5Fran/WG2%5FRL2/Specifications/201906%5Fdraft%5Fspecs%5Fafter%5FRAN%5F84 [retrieved on Jun. 22, 2019] pp. 197, 198, 384, 355, 192, 193, 314, 315.

CMCC: "Consideration of Beamforming for NR Conditional Handover," 3GPP Draft, 3GPP TSG-RAN WG2 Meeting #106, R2-1905949, Consideration of Beamforming for NR Conditional Handover, 3rd Generation Partnership Project (3GPP), Mobile Competence Centre, 650, Route Des Lucioles, F-06921, Sophia-Antipolis Cedex, France, vol. RAN WG2. No. Reno. USA, May 13, 2019-May 17, 2019, May 13, 2019 (May 13, 2019), XP051729441, 3 pages, Retrieved from the Internet: URL: http://www.3gpp.org/ftp/Meetings%5F3GPP%5FSYNC/RAN2/Docs/R2%2D1905949%2Ezip [retrieved on May 13, 2019] Section 2.

Ericsson: "On FR2 Impact on CHO," 3GPP Draft, 3GPP TSG RAN WG2 #106, R2-1906218-On FR2 Impact on CHO, 3rd Generation Partnership Project (3GPP), Mobile Competence Centre, 650, Route Des Lucioles, F-06921, Sophia-Antipolis Cedex, France, vol. RAN WG2, No. Reno, US; May 13, 2019-May 17, 2019, May 13, 2019 (May 13, 2019), XP051729690, 6 pages, Retrieved from the Internet: URL: http://www.3gpp.org/ftp/Meetings%5F3GPP%5FSYNC/RAN2/Docs/R2%2D1906218%2Ezip [retrieved on 2819-85-13] Section 2.1.

Ericsson: "Triggering of Conditional Handover in NR," 3GPP Draft, 3GPP TSG RAN WG2 #106, R2-1906211—Triggering of Conditional Handover in NR, 3rd Generation Partnership Project (3GPP), Mobile Competence Centre, 650, Route Des Lucioles, F-06921, Sophia-Antipolis Cedex, France, vol. RAN WG2. No. Reno. US, May 13, 2019-May 17, 2019, May 13, 2019 (May 13, 2019), XP051729684, 7 pages, Retrieved from the Internet: URL: http://www.3gpp.org/ftp/Meetings%5F3GPP%5FSYNC/RAN2/Docs/R2%2D1906211%2Ezip [retrieved on May 13, 2019] Section 2.1.

International Search Report and Written Opinion—PCT/US2020/039530—ISA/EPO dated Aug. 18, 2020.

* cited by examiner

BEAM SELECTION FOR INITIATING RANDOM ACCESS DURING CONDITIONAL HANDOVER EXECUTION

CROSS REFERENCE

The present application for patent claims the benefit of U.S. Provisional Patent Application No. 62/867,115 by PURKAYASTHA et al., entitled "BEAM SELECTION FOR INITIATING RANDOM ACCESS DURING CONDITIONAL HANDOVER EXECUTION," filed Jun. 26, 2019, assigned to the assignee hereof, and expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may undergo a handover procedure from a source cell, with which the UE is currently connected, to a target cell. In some cases, the target cell may be associated with the same base station as the source cell. In some cases, the target cell may be associated with a base station different from the base station associated with the source cell. Efficient handover procedures are desirable for UEs in wireless communications systems.

SUMMARY

The described techniques relate to improved methods, systems, devices, and apparatuses that support beam selection for initiating random access during conditional handover (CHO) execution. Various aspects of the present disclosure describe techniques that provide for configuration of CHO operations. For example, a source base station may configure a user equipment (UE) with one or more CHO configurations (e.g., where each CHO configuration may apply to one or more target cells). A CHO configuration may provide, for corresponding target cell(s), one or more associated conditions that may trigger the UE to initiate a handover to the particular target cell (e.g., based on a measurement threshold of one or more target cell measurements, one or more source base station measurements, or combinations thereof).

CHO configurations may further include random access channel (RACH) configuration information (e.g., beam quality thresholds, beam quality threshold offsets, one or more beams associated with configured contention free random access (CFRA) resources, one or more beams associated with configured contention based random access (CBRA) resources, or some combination thereof). A UE may, upon detection that a handover condition in a CHO configuration has been satisfied, select a target cell beam (e.g., a target base station beam) for transmission of a random access request based on the RACH configuration information included in the CHO configuration. For example, upon satisfaction of a handover condition in a CHO configuration, the UE may determine a selected beam for a random access procedure on the target cell based on comparing a set of beam measurements of the target cell with the beam quality threshold, considering beams associated with configured CFRA resources that fall within the beam quality threshold offset, etc., based on RACH configuration information included in the CHO configuration. In various examples, the selected beam may correspond to a highest quality beam with a highest quality beam measurement value above the beam quality threshold, a beam with an earliest configured CFRA time-frequency resource, a beam with an earliest configured CBRA time-frequency resource, etc.

A method of wireless communication at a UE is described. The method may include receiving, from a source base station, a conditional handover configuration indicative of a target cell for handover of the UE upon satisfaction of a condition, the conditional handover configuration also indicative of a beam quality threshold for a random access procedure on the target cell upon satisfaction of the condition. The method may also include initiating a handover procedure to the target cell based on satisfaction of the condition indicated by the conditional handover configuration. The method may also include determining, from a set of beam measurements of the target cell, a selected beam for the random access procedure on the target cell based on the beam quality threshold. Additionally, the method may include transmitting, based on the selected beam of the target cell, a random access request to the target cell to initiate the random access procedure on the target cell for the handover of the UE.

An apparatus for wireless communication at a UE is described. The apparatus may include a processor, memory coupled with the processor, and instructions stored in the memory. The instructions may be executable by the processor to cause the apparatus to receive, from a source base station, a conditional handover configuration indicative of a target cell for handover of the UE upon satisfaction of a condition, the conditional handover configuration also indicative of a beam quality threshold for a random access procedure by the UE on the target cell upon satisfaction of the condition. The instructions may also be executable by the processor to cause the apparatus to initiate a handover procedure to the target cell based on satisfaction of the condition indicated by the conditional handover configuration. The instructions may also be executable by the processor to cause the apparatus to determine, from a set of beam measurements of the target cell, a selected beam for a random access procedure on the target cell based on the beam quality threshold. Additionally, the instructions may be executable by the processor to cause the apparatus to transmit, based on the selected beam of the target cell, a random access request to the target cell to initiate the random access procedure on the target cell for the handover of the UE.

Another apparatus for wireless communication at a UE is described. The apparatus may include means for receiving, from a source base station, a conditional handover configuration indicative of a target cell for handover of the UE upon satisfaction of a condition, the conditional handover configuration also indicative of a beam quality threshold for a random access procedure on the target cell upon satisfaction of the condition. The apparatus may also include means for include initiating a handover procedure to the target cell based on satisfaction of the condition indicated by the conditional handover configuration. The apparatus may also include means for determining, from a set of beam measurements of the target cell, a selected beam for the random access procedure on the target cell based on the beam quality threshold. Additionally, the apparatus may include means for transmitting, based on the selected beam of the target cell, a random access request to the target cell to initiate the random access procedure on the target cell for the handover of the UE.

A non-transitory computer-readable medium storing code for wireless communication at a UE is described. The code may include instructions executable by a processor to receive, from a source base station, a conditional handover configuration indicative of a target cell for handover of the UE upon satisfaction of a condition, the conditional handover configuration also indicative of a beam quality threshold for a random access procedure on the target cell upon satisfaction of the condition. The code may also include instructions executable by a processor to initiate a handover procedure to the target cell based on satisfaction of the condition indicated by the conditional handover configuration. The code may also include instructions executable by a processor to determine, from a set of beam measurements of the target cell, a selected beam for the random access procedure on the target cell based on the beam quality threshold. Additionally, the code may also include instructions executable by a processor to transmit, based on the selected beam of the target cell, a random access request to the target cell to initiate the random access procedure on the target cell for the handover of the UE.

In some examples of the method, apparatuses, and non-transitory computer-readable medium described herein, determining the selected beam for the random access procedure may include operations, features, means, or instructions for identifying that the conditional handover configuration does not associate contention free random access resources with any beam of the target cell, comparing each of the set of beam measurements of the target cell with the beam quality threshold, and identifying one or more beams of the set of beams that satisfy the beam quality threshold.

Some examples of the method, apparatuses, and non-transitory computer-readable medium described herein may further include operations, features, means, or instructions for selecting a highest quality beam with a highest quality beam measurement value of the identified one or more beams as the selected beam. Some examples of the method, apparatuses, and non-transitory computer-readable medium described herein may further include operations, features, means, or instructions for selecting a beam with an earliest configured contention based random access time-frequency resource as the selected beam.

In some examples of the method, apparatuses, and non-transitory computer-readable medium described herein, transmitting the random access request to the target cell may include operations, features, means, or instructions for transmitting the random access request as part of a contention based random access procedure. Some examples of the method, apparatuses, and non-transitory computer-readable medium described herein may further include operations, features, means, or instructions for identifying that the conditional handover configuration further indicates a set of beams of the target cell configured with contention free random access resources.

In some examples of the method, apparatuses, and non-transitory computer-readable medium described herein, determining the selected beam for the random access procedure may include operations, features, means, or instructions for comparing each of the set of beam measurements of the target cell with the beam quality threshold, identifying one or more beams of the set of beams that satisfy the beam quality threshold, identifying that none of the one or more beams that satisfy the beam quality threshold may be among the set of beams configured with contention free random access resources, and selecting a highest quality beam of the identified one or more beams as the selected beam, where the random access request may be transmitted as part of a contention based random access procedure on the selected highest quality beam of the target cell.

In some examples of the method, apparatuses, and non-transitory computer-readable medium described herein, determining the selected beam for the random access procedure may include operations, features, means, or instructions for comparing each of the set of beam measurements of the target cell with the beam quality threshold, identifying one or more beams of the set of beams that satisfy the beam quality threshold, and selecting a highest quality beam of the identified one or more beams as the selected beam, regardless of whether the highest quality beam may be among the set of beams configured with contention free random access resources, where the random access request may be transmitted on the selected highest quality beam of the target cell as part of either a contention based random access procedure or a contention free random access procedure, based on whether the highest quality beam may be among the set of beams configured with contention free random access resources.

In some examples of the method, apparatuses, and non-transitory computer-readable medium described herein, determining the selected beam for the random access procedure may include operations, features, means, or instructions for comparing each of the set of beam measurements of the target cell with the beam quality threshold, identifying one or more beams of the set of beams that satisfy the beam quality threshold, and selecting, as the selected beam, a highest quality beam of the identified one or more beams that may be also among the set of beams configured with contention free random access resources, where the random access request may be transmitted as part of a contention free random access procedure. Some examples of the method, apparatuses, and non-transitory computer-readable medium described herein may further include operations, features, means, or instructions for identifying that the conditional handover configuration further indicates a beam quality threshold offset for the target cell.

In some examples of the method, apparatuses, and non-transitory computer-readable medium described herein, determining the selected beam for the random access procedure may include operations, features, means, or instructions for comparing beam measurements of each of the set of beams of the target cell configured with contention free random access resources with the beam quality threshold, identifying that none of the set of beams satisfy the beam quality threshold, but that one or more beams of the set of beams may be within the beam quality threshold offset from the beam quality threshold, and selecting a highest quality beam of the identified one or more beams as the selected beam, where the random access request may be transmitted on the selected highest quality beam as part of a contention free random access procedure.

In some examples of the method, apparatuses, and non-transitory computer-readable medium described herein, determining the selected beam for the random access procedure may include operations, features, means, or instructions for comparing each of the set of beam measurements of the target cell with the beam quality threshold, identifying that none of the set of beams satisfy the beam quality threshold, but that one or more beams of the set of beams may be within the beam quality threshold offset from the beam quality threshold, and selecting, as the selected beam, either a first beam having an earliest configured contention free random access time-frequency resource or a second beam having an earliest configured contention based random access time-frequency resource based on whether any of the set of beams may have contention free random access time-frequency resources configured, where the random access request may be transmitted as part of either a contention based random access procedure or a contention free random access procedure, based on whether the selected beam may be configured with contention free random access resources or contention based random access resources.

A method of wireless communication at a source base station is described. The method may include receiving, from a UE, a cell measurement report indicative of a target cell. The method may also include transmitting, to the UE, a conditional handover configuration indicative of the target cell for handover of the UE upon satisfaction of a condition, the conditional handover configuration also indicative of a beam quality threshold for a random access procedure by the UE on the target cell.

An apparatus for wireless communication at a source base station is described. The apparatus may include a processor, memory coupled with the processor, and instructions stored in the memory. The instructions may be executable by the processor to cause the apparatus to receive, from a UE, a cell measurement report indicative of a target cell. The instructions may also be executable by the processor to cause the apparatus to transmit, to the UE, a conditional handover configuration indicative of the target cell for handover of the UE upon satisfaction of a condition, the conditional handover configuration also indicative of a beam quality threshold for a random access procedure by the UE on the target cell.

Another apparatus for wireless communication at a source base station is described. The apparatus may include means for receiving, from a UE, a cell measurement report indicative of a target cell. The apparatus may also include means for transmitting, to the UE, a conditional handover configuration indicative of the target cell for handover of the UE upon satisfaction of a condition, the conditional handover configuration also indicative of a beam quality threshold for a random access procedure by the UE on the target cell.

A non-transitory computer-readable medium storing code for wireless communication at a source base station is described. The code may include instructions executable by a processor to receive, from a UE, a cell measurement report indicative of a target cell. The code may also include instructions executable by a processor to transmit, to the UE, a conditional handover configuration indicative of the target cell for handover of the UE upon satisfaction of a condition, the conditional handover configuration also indicative of a beam quality threshold for a random access procedure by the UE on the target cell.

Some examples of the method, apparatuses, and non-transitory computer-readable medium described herein may further include operations, features, means, or instructions for configuring one or more contention free random access resources for each beam in a set of beams of the target cell, where the conditional handover configuration may be also indicative of the set of beams of the target cell configured with the one or more contention free random access resources.

Some examples of the method, apparatuses, and non-transitory computer-readable medium described herein may further include operations, features, means, or instructions for determining a beam quality threshold offset for the target cell, where the conditional handover configuration may be also indicative of the beam quality threshold offset. In some examples of the method, apparatuses, and non-transitory computer-readable medium described herein, the beam quality threshold offset may be determined based on the configured one or more contention free random access resources.

Some examples of the method, apparatuses, and non-transitory computer-readable medium described herein may further include operations, features, means, or instructions for determining the condition, the beam quality threshold, a beam quality threshold offset, or some combination thereof, based on the received cell measurement report, where the received cell measurement report may be also indicative of one or more beam measurements corresponding to the target cell.

DETAILED DESCRIPTION

Figure 1:
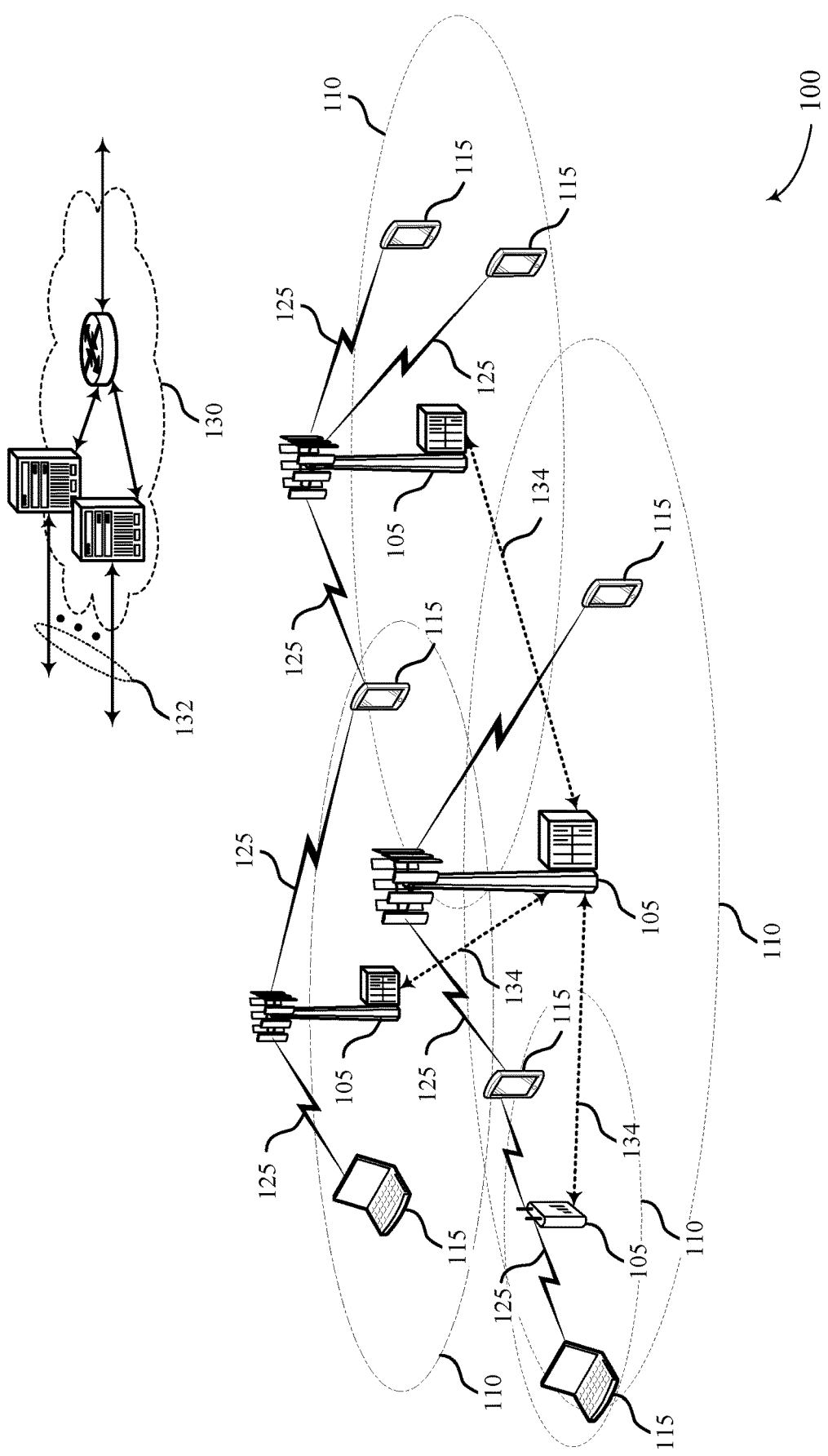
FIG. 1 illustrates an example of a system for wireless communications that supports beam selection for initiating random access during conditional handover (CHO) execution in accordance with aspects of the present disclosure.

Various aspects of the present disclosure provide techniques for user equipment (UE) handover in a wireless communications system. A UE may undergo a handover procedure from source cell of a base station with which the UE is currently connected to a target cell. In some cases, the target cell may be associated with the same base station as the source cell. However, in some cases, the target cell may be associated with a base station different from the base station associated with the source cell. For example, the target cell may be associated with a base station that is of a different type and/or operates on a different frequency than the base station associated with the source cell. The UE may release or drop an existing connection with the source cell to establish a new connection with the target cell. For example, a handover condition may arise when the UE is moving relative to one or more base stations (e.g., into the coverage area of a target cell), or when connections or channel conditions associated with the source base station deteriorate, etc., which may result in the UE undergoing the handover procedure. In some cases, the handover procedure may be initiated by the source base station and target base station exchanging information associated with the UE, and the source base station sending a handover command to the UE. The UE may drop the existing connection with the source base station upon receiving the handover command, and initiate a random access procedure with the target base station to establish a connection with the target base station.

In some examples, one or more handover configurations may be provided to a UE prior to the UE initiating a handover. For example, one or more conditional handover (CHO) configurations may be provided to a UE prior to the UE initiating a handover, and the UE may initiate the handover (e.g., the CHO) upon detecting a condition indicated by the CHO configuration has been satisfied. In some examples, a source base station may configure a UE with one or more CHO configurations for multiple target cells. The CHO configurations may provide, for each target cell, one or more associated conditions that may trigger the UE to initiate a handover to the particular target cell (e.g., based on a cell measurement threshold of one or more target cell measurements, one or more source base station measurements, or combinations thereof). As such, CHO configurations may provide one or more handover criteria (e.g., conditions) for one or more target cells. The UE may perform one or more measurements of the target cell(s), the source base station, or combinations thereof, and if the measurements meet the handover criteria the UE may initiate the handover with a target cell that met the handover criteria (e.g., by transmitting a random access request to the target cell). CHO configurations may thus allow for a UE to autonomously initiate a handover in the event that CHO criteria are met (e.g., if a source base station measurement is below a threshold and the target cell measurement is above a threshold).

In accordance with various techniques discussed herein, CHO configurations may further include random access channel (RACH) configuration information (e.g., beam quality thresholds, beam quality threshold offsets, one or more contention free random access (CFRA) resources, one or more contention based random access (CBRA) resources, or some combination thereof) for more efficient CHO. A UE may, upon detection that a handover condition in a CHO configuration has been satisfied, select a target cell beam (e.g., a target base station beam) for transmission of a random access request based on the RACH configuration information included in the CHO configuration. For example, upon satisfaction of a handover condition in a CHO configuration, the UE may determine a selected beam for a random access procedure on the target cell based on comparing a set of beam measurements of the target cell with the beam quality threshold, based on consideration of beams associated with configured (e.g., reserved) CFRA resources that fall within the beam quality threshold offset, etc., according to RACH configuration information included in the CHO configuration. In various examples, the selected beam may correspond to a highest quality beam with a highest quality beam measurement value above the beam quality threshold, a beam with an earliest configured CFRA time-frequency resource, a beam with an earliest configured CBRA time-frequency resource, etc.

Such techniques may allow for more efficient CHO (e.g., for more efficient UE random access procedures with a target cell associated with a triggered CHO). For example, CHO configurations may include a beam quality threshold for selection of a beam suitable for a random access transmission by the UE, which may improve the success rate of random access procedures performed between the UE and the target cell. According to some aspects of the described techniques, CHO configurations may further include an indication of beams associated with configured (e.g., target cell-configured) CFRA resources, an indication of beams associated with configured CBRA resources, a beam quality threshold offset, etc. Such information may be considered by the UE, such that the UE may select a beam corresponding to a next (e.g., earliest) CFRA resource or CBRA resource, which may reduce latency and service interruptions associated with a CHO procedure. For example, one or more integrated circuits (e.g., processors, memory coupled with processors, transceivers, etc.) of the UE may implement the efficient CHO techniques discussed herein to improve the quality of transmissions and reduce the latency associated with handover procedures performed by the UE.

Aspects of the disclosure are initially described in the context of a wireless communications system. Example process flows implementing aspects of the discussed techniques are then described. Aspects of the disclosure are further illustrated by and described with reference to apparatus diagrams, system diagrams, and flowcharts that relate to beam selection for initiating random access during CHO execution.

FIG. 1 illustrates an example of a wireless communications system 100 that supports beam selection for initiating random access during CHO execution in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

In some cases, a base station 105 may be a source base station 105 and may configure one or more UEs 115 with one or more CHO configurations for one or more target cells (e.g., target base stations 105). The CHO configurations may provide, for each target cell, one or more associated conditions that may trigger the UE 115 to initiate a handover to the particular target cell (e.g., based on a measurement threshold of one or more target cell measurements, a measurement threshold one or more source base station 105 measurements, a comparison of target cell measurements with source base station 105 measurements, etc.). In some cases, the CHO configurations may include RACH configuration information (e.g., beam quality thresholds, beam quality threshold offsets, beams associated with configured CFRA resources, beams associated with configured CBRA resources, or some combination thereof). A UE 115 may, upon detection that a HO condition in a CHO configuration has been satisfied, select a target cell beam (e.g., a target base station 105 beam) for transmission of a random access request based on the RACH configuration information included in the CHO configuration.

Figure 2:
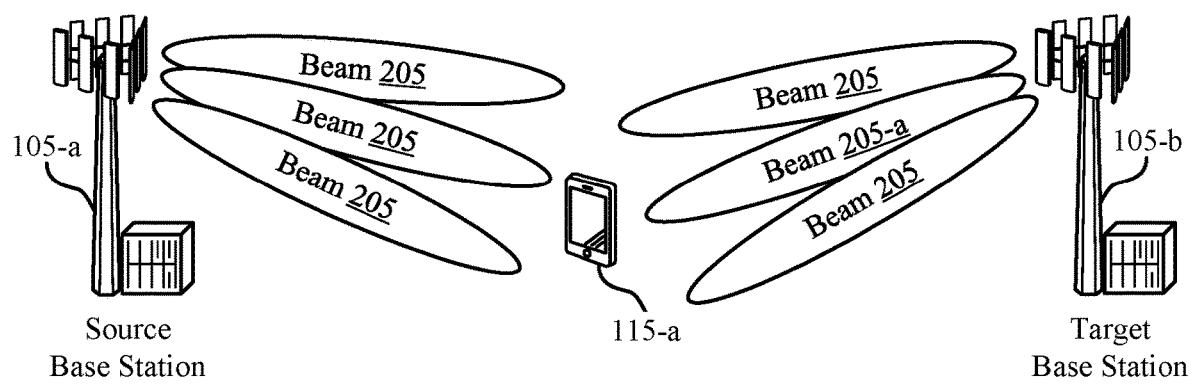
FIG. 2 illustrates an example of a wireless communications system that supports beam selection for initiating random access during CHO execution in accordance with aspects of the present disclosure.

FIG. 2 illustrates an example of a wireless communications system 200 that supports beam selection for initiating random access during CHO execution in accordance with aspects of the present disclosure. In some examples, wireless communications system 200 may implement aspects of wireless communications system 100. The wireless communications system 200 may include a source base station 105-a and a target base station 105-b, which may be examples of base stations 105 described with reference to FIG. 1. The wireless communications system 200 may also include a UE 115-a, which may be an example of a UE 115 described with reference to FIG. 1. The wireless communications system 200 may illustrate an example of a CHO procedure where a communication connection between the UE 115-a and the source cell served by the source base station 105-a (e.g., first base station) is handed over to the target base station 105-b (e.g., a target cell).

Initially, the UE 115-a and the source base station 105-a may be in a connected state (e.g., and may be exchanging information over a first communication connection). In some cases, the UE 115-a may transmit one or more measurement reports in which the UE 115-a may provide one or more cell measurements of the source base station 105-a and a number of neighboring base stations (e.g., that include the target base station 105-b). In some cases, such a measurement report may be referred to as initial measurement report, a "low" threshold measurement report, etc. Based on the measurements in the measurement report, the source base station 105-a may identify one or more neighboring base stations 105 (e.g., one or more target cells) that are good candidates for handover of the UE 115-a (e.g., based on cell signal strength measurements being above a threshold value). For example, the source base station 105-a may identify one or more target cells (e.g., target base station 105-b) as handover candidates, and may communicate handover requests (e.g., via backhaul links) to each identified candidate (e.g., to target base station 105-b). In some cases (e.g., in the example of FIG. 2), the target base station 105-b may perform admission control based on the received handover request and reserve certain resources for the UE 115-a (e.g., CFRA resources, such as a CFRA preamble, CBRA resources, other random access resources, etc.). The target base station 105-b may then provide information for random access to the source base station 105-a. Using such information, the source base station 105-a may configure a CHO configuration for the UE 115-a.

The source base station 105-a may provide CHO configurations to the UE 115-a, which may be used by the UE 115-a to autonomously initiate a handover to a second communication connection with a target cell (e.g., with target base station 105-b). In some cases, CHO configuration may be provided in RRC signaling (e.g., in an RRC reconfiguration message) that is transmitted to the UE 115-a. A CHO configuration may provide, for example, a cell ID of the associated target base station 105, information for random access to the target base station 105 (e.g., CFRA resources, a random access preamble, a cell-specific radio network temporary identifier (C-RNTI), etc.), and one or more measurement thresholds (e.g., radio resource management (RRM) thresholds, channel quality metric thresholds, signal strength metric thresholds, etc.) that are to be used to trigger handover to the associated target base station 105. In some cases, such measurement thresholds may be referred to as handover conditions.

In accordance with various techniques provided herein, the CHO configurations provided to the UE 115-a may include RACH configuration information (e.g., beam quality thresholds, beam quality threshold offsets, one or more CFRA resources, one or more CBRA resources, or some combination thereof) for improved random access procedures with a target cell triggering CHO. UE 115-a may, upon detection that a handover condition in a CHO configuration has been satisfied, select a target cell beam 205-a (e.g., a target base station 105-b beam) for transmission of a random access request based at least in part on the RACH configuration information included in the CHO configuration. RACH configuration information (e.g., RACH-ConfigDedicated and RACH-ConfigCommon information elements (IEs)) provided in a CHO configuration may generally include an association of synchronization signal blocks (SSBs) (or channel state information reference signals (CSI-RSs)) with time-frequency RACH resources (e.g., occasions) to be used for preamble transmission, a beam quality threshold (e.g., beamRACHThresh), a beam quality threshold offset (e.g., delta offset CFRA beam selection), a set of beams 205 for which CFRA should be used if selected, configured CFRA resources (e.g., dedicated preamble) for each beam 205 of the set of beams 205 for which CFRA should be used if selected, CBRA resources, etc. As discussed herein, a CHO configuration (e.g., and thus RACH configuration information included in the CHO configuration) may correspond to one or more target cells (e.g., target base stations 105), and one or more CHO configurations may be configured by source base station 105-a.

Aspects of the described techniques provide for UE 115-a beam selection (e.g., beam selection for transmission of a random access request to target base station 105-b) based on RACH configuration information included in a CHO configuration (e.g., included in a CHO configuration associated with a handover condition that has been satisfied). In some examples a beam selection policy (e.g., the method in which a UE selects a beam 205 for initiation of a RACH procedure with a target base station upon satisfaction of a HO condition associated with a CHO configuration) may be preconfigured by the network, dynamically indicated via RRC signaling, or left up to UE implementation. In some cases, UE 115-a beam selection may depend on information included in the CHO configuration (e.g., beam selection may depend on whether CFRA resources are configured and indicated by the CHO configuration, whether the CHO configuration includes a beam quality threshold offset, etc.).

For example, UE 115-a may transmit a measurement report to source base station 105-a and receive a CHO configuration from the source base station 105-a (e.g., the CHO configuration based at least in part on handover request and handover acknowledgement signaling between the source base station 105-a and target base station 105-b). If the UE 115-a identifies that a condition indicated by the CHO configuration has been satisfied, the UE 115-a may initiate a handover procedure to the target base station 105-b and determine or select a beam 205-a for a random access procedure with the target cell (e.g., with the target base station 105-b). For example, the UE 115-a may perform additional beam measurements upon satisfaction of the handover condition or may use previously measured beam measurements (e.g., beam measurements used to determine cell measurements included in the initial beam measurement reporting to source base station 105-a) to identify one or more beams 205 above a beam quality threshold indicated in the CHO configuration (e.g., indicated in RACH configuration information included in the CHO configuration). The UE 115-a may then select a beam 205-a from the identified one or more beams 205 above the beam quality threshold and transmit a random access preamble using the selected beam 205-a.

In some cases, target base station 105-b may reserve CFRA resources (e.g., a CFRA preamble) for the UE. For example, upon receiving a handover request from source base station 105-a, target base station 105-b may reserve CFRA resources for UE 115-a in case a HO condition is satisfied (e.g., as target base station 105-b reservation of CFRA resources may reduce latency associated with a RACH procedure between the UE 115-a and the target base station 105-b, should CHO be triggered at the UE 115-a). In other cases, target base station 105-b may not reserve CFRA resources for a UE (e.g., as such resources may instead be allocated to other devices).

In cases where target base station 105-b reserves CFRA resources for UE 115-a, the CFRA resources and a set of beams 205 corresponding to the CFRA resources may be indicated by the CHO configuration sent from the source base station 105-a to the UE 115-a (e.g., such that UE 115-a may identify which beams 205 of target base station 105-b correspond to reserved CFRA resources). In some examples, UE 115-a may consider such reserved CFRA resources when selecting a beam 205-a. For example, UE 115-a may select a best beam 205-a (e.g., a beam associated with a highest reference signal received power (RSRP), a beam associated with a highest reference signal received quality (RSRQ), etc.) from the set of beams 205 with reserved CFRA resources that exceed the beam quality threshold indicated by the CHO configuration. In some cases, UE 115-a may select a beam 205-a corresponding to a next available CFRA resource that is above the beam quality threshold (e.g., to reduce latency associated with the CHO procedure/RACH procedure by utilizing a next available reserved CFRA resource).

In some examples, UE 115-a may select a beam 205-a based on such reserved CFRA resource considerations regardless of whether or not the beam 205-a exceeds the beam quality threshold (e.g., in some cases, CFRA resource considerations may override the beam quality threshold). For example, in some cases, CHO configurations may include a beam quality threshold offset. UE 115-a may select a beam 205-a associated with reserved CFRA resources, even if the beam 205-a is not above the beam quality threshold, if the beam quality is within a delta offset (e.g., the beam quality threshold offset) of the beam quality threshold. In some cases, from among beams 205 within the beam quality threshold offset, the UE 115-a may select the beam 205-a with the first (e.g., earliest, next, etc.) reserved CFRA resource. If there is no such beam 205 with reserved CFRA resources, the UE 115-a may select a beam 205-a with the first (e.g., earliest, next, etc.) available CBRA resource.

In cases where a CHO configuration does not include an indication of beams 205 associated with reserved CFRA resources (e.g., in cases where target base station 105-b does not reserve CFRA resources for UE 115-a), UE 115-a may select a highest quality beam 205-a above the beam quality threshold, a beam 205-a above the beam quality threshold that is associated with a next available CBRA resource, etc.

For example, UE 115-a may select a beam 205-a in the target cell (e.g., a target base station 105-b beam 205-a) for RACH preamble transmission based on criteria illustrated by Table 1 (shown below). Table 1 may illustrate example beam selection policy based on RACH configuration information included in a CHO configuration (e.g., a beam quality threshold, a beam quality threshold offset, etc.), based on consideration of reserved CFRA resources, etc. Specifically, Table 1 may illustrate beam selection techniques based on whether or not the CHO configuration indicates beams 205 with reserved CFRA resources.

TABLE 1

| No beams specified with CFRA resources | A set of beams specified with CFRA resources |
| --- | --- |
| UE selects the highest quality beam among those above configured threshold (above the beam quality threshold indicated by the CHO configuration), and the UE initiates a CBRA procedure using the selected beam | (1) If among beams above the beam quality threshold there is no beam with specified CFRA resources, UE selects the highest quality beam and initiates a CBRA procedure<br>(2) If some beams above the beam quality threshold have specified CFRA resources:<br>Option 1: UE selects the highest quality beam and initiates either a CBRA or CFRA procedure based on the RACH configuration for the particular beam<br>Option 2: UE selects the highest quality beam for which CFRA resources have been specified, and initiates the CFRA procedure, even though that beam is not the best beam<br>(3) If there are no beams above the beam quality threshold, but there are beams within a beam quality threshold offset (e.g., a delta offset) of the beam quality threshold<br>Option 3a: UE selects the beam with CFRA resources as the best beam, even if the beam is not above the threshold but within a delta offset of the threshold<br>Option 3b: Among beams within delta offset of threshold, UE selects beam with first (earliest) CFRA RACH resource; if there is no such beam with CFRA RACH resources, UE selects beam with first (earliest) CBRA RACH resource |

Figure 3:
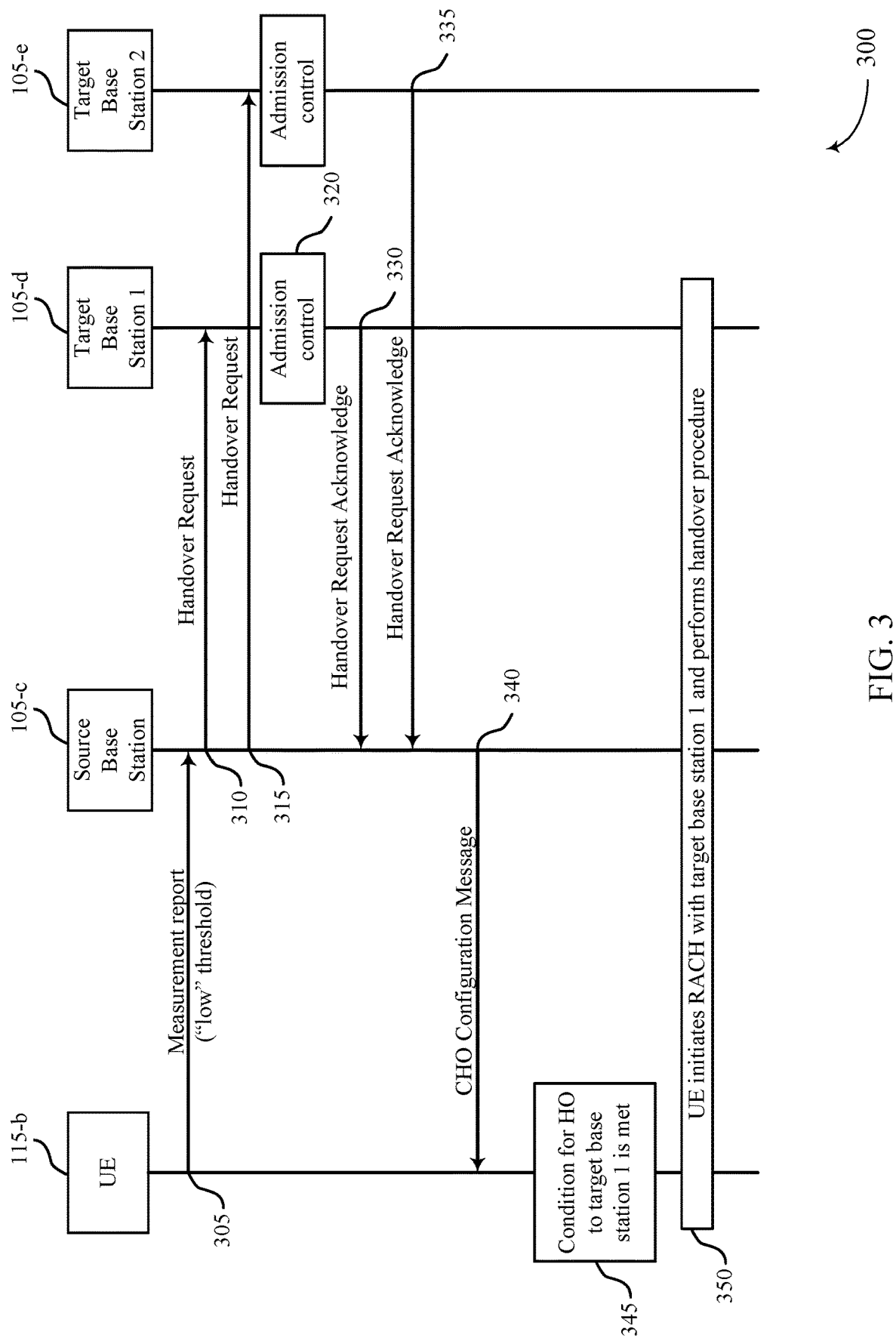
FIG. 3 illustrates an example of a process flow that supports beam selection for initiating random access during CHO execution in accordance with aspects of the present disclosure.

FIG. 3 illustrates an example of a general process flow 300 that supports beam selection for initiating random access during CHO execution in accordance with aspects of the present disclosure. In some examples, process flow 300 may implement aspects of wireless communications system 100 and/or wireless communications system 200. The process flow in this example includes a UE 115-b, which may be an example of a UE described with reference to FIGS. 1 and 2; a source base station 105-c, a first target base station 105-d, and a second target base station 105-e, which may be examples of base stations described with reference to FIGS. 1 and 2. The process flow 300 includes functions and communications implemented by UE 115-b and base stations 105-c, 105-d, and 105-e in the context of CHO procedures.

In the following description of the process flow 300, the operations between UE 115-b and base station 105-c, 105-d, and 105-e may be transmitted in a different order than the order shown, or the operations may be performed in different orders or at different times. Certain operations may also be left out of the process flow 300, or other operations may be added to the process flow 300. It is to be understood that while base stations 105 and UE 115-b are shown performing a number of the operations of process flow 300, any wireless device may perform the operations shown.

At 305, the UE 115-b may transmit a measurement report to the source base station 105-c. The measurement report may include one or more channel measurements for the source base station 105-c, as well as measurements for one or more cells (e.g., neighboring base stations), which may include the first target base station 105-d and the second target base station 105-e. The measurement report may be a "low" threshold measurement report, which may indicate that a channel measurement associated with the source base station 105-c is below a threshold value that is used to indicate that the source base station 105-c should configure a CHO for the UE 115-b.

At 310, the source base station 105-c may transmit a handover request to the first target base station 105-d. Further, at 315, the source base station 105-c may transmit a handover request to the second target base station 105-e. In some cases, the source base station 105-c may select the first target base station 105-d and the second target base station 105-e for the handover requests based on associated cell measurements from the measurement report of the UE 115-b (e.g., based on neighboring base station measurements that are above a threshold value or that are better than other of the neighboring base station measurements). While this example shows two target base stations 105, more or fewer target base stations 105 may be identified for CHO configuration. In some cases, the handover requests may include handover information associated with the UE 115-b.

At 320, the first target base station 105-d may perform admission control responsive to receiving the handover request. Likewise, at 325, the second target base station 105-e may perform admission control responsive to receiving the handover request. The admission control may determine that resources may be reserved for the UE 115-c (e.g., a C-RNTI, CFRA resources, random access preamble, etc.).

At 330, the first target base station 105-d may transmit a handover request acknowledgment to the source base station 105-c. Further, in this example, at 335, the second target base station 105-e may transmit a handover request acknowledgment to the source base station 105-c. In some cases, the handover request acknowledgments may include information for use by the UE 115-b to establish a connection (e.g., reserved CFRA time-frequency resources, random access preamble, C-RNTI, etc.). The source base station 105-c may receive the handover request acknowledgments, and determine CHO criteria for each target cell for use by the UE 115-b to trigger a CHO. The CHO criteria may include, for example, one or more measurement thresholds of the associated target base station 105, the source base station 105-c, or any combinations thereof.

At 340, the source base station 105-c may transmit CHO configuration information to the UE 115-b (e.g., in a RRC reconfiguration message). In some cases, the CHO configuration message may indicate that the first target base station 105-d and the second target base station 105-e are configured for CHO, may provide information for accessing the associated base stations 105 (e.g., random access information, C-RNTI, etc.), and may provide handover thresholds associated with each target base station 105. The CHO configuration message may include RACH configuration information for first target base station 105-d and/or the second target base station 105-e.

At 345, the UE 115-b may determine that a condition for handover to the first target base station 105-d is met. Such a determination may be made, for example, based on one or more channel quality measurements or target cell measurements by the UE 115-b that are compared to the CHO configurations provided by the source base station 105-c. At 350, the UE 115-b may initiate a RACH procedure with the first target base station 105-d and perform the handover procedure. According to the techniques described herein (e.g., based on RACH configuration information included in the CHO configuration message), the UE 115-b may determine a selected beam for random access request transmission to the first target base station 105-d.

Figure 4:
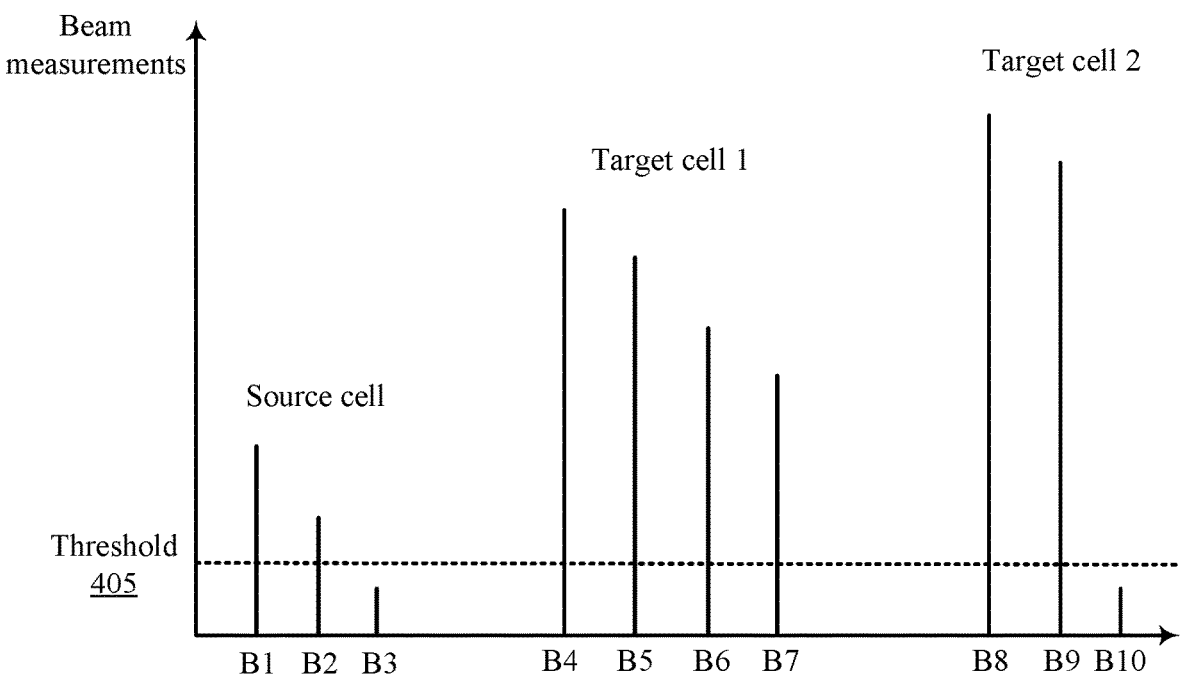
FIG. 4 illustrates an example of a beam measurement diagram that supports beam selection for initiating random access during CHO execution in accordance with aspects of the present disclosure.

FIG. 4 illustrates an example of a beam measurement diagram 400 that supports beam selection for initiating random access during CHO execution in accordance with aspects of the present disclosure. In some examples, beam measurement diagram 400 may implement aspects of wireless communications system 100 and/or wireless communications system 200. For example, beam measurement diagram 400 may illustrate cell measurements (e.g., beam measurements of one or more target cells) measured by a UE. In some cases, beam measurements exemplified by beam measurement diagram 400 may be used for target cell selection for a CHO procedure. Beam measurement diagram 400 generally illustrates how a target cell (e.g., 'Target cell 1') may be selected when multiple target cells satisfy CHO condition(s) indicated by a CHO configuration. A UE may then select a beam for a RACH procedure with the selected target cell (e.g., a beam for random access preamble transmission to the selected target cell) based on RACH configuration information included in the CHO configuration message.

In some cases, a measurement configuration may be provided by the CHO configuration message (e.g., in some cases the CHO configuration message may configure specific beams for the UE to measure or the UE may measure all beams of candidate cells). A UE may measure cells according to the measurement configuration, and evaluate cell measurements according to handover conditions or criteria indicated in the CHO configuration. For CHO triggering and selection of a target cell for handover, a UE may first select those target cells which meet the configured event-triggered criteria (e.g., based on cell measurements and A3/A5 HO trigger events). If there are multiple target cells which meet the event-triggered criteria (e.g., if multiple cells meet handover conditions indicated by the CHO configuration), the UE may select the cell (e.g., for CHO) with a maximum number of suitable candidate beams (e.g., beams with some quality parameter above a threshold, etc.). For example, a UE may perform cell measurements of a 'Target cell 1' and a 'Target cell 2,' and may identify (e.g., based on one or more handover conditions associated with 'Target cell 1' and a 'Target cell 2,' as indicated by the CHO configuration) that 'Target cell 1' and a 'Target cell 2' meet the conditions for CHO. The UE may then select one of 'Target cell 1' or 'Target cell 2' for CHO execution based on beam measurements associated with 'Target cell 1' or 'Target cell 2' (e.g., based on which of 'Target cell 1' or 'Target cell 2' corresponds to more suitable candidate beams). As such, CHO configurations may also include a suitable beam threshold 405 (e.g., beam Thresh) for a UE to determine whether a measured beam qualifies as a suitable candidate beam (e.g., whether a measured beam of a candidate target cell is above configured threshold, beam Thresh).

For example, a UE may receive a CHO configuration message indicating a measurement configuration (e.g., where, in some cases, the measurement configuration is determined by the source base station based on an initial or "low" threshold measurement report sent by the UE, based on handover acknowledgements received from neighbor target cells, etc.). For example, 'Source cell' may include beams (e.g., beams B1, B2, and B3) that may be measured for the initial or "low" threshold measurement report sent by the UE. In the example of FIG. 4, the measurement configuration may configure the UE to measure 'Target cell 1' and 'Target cell 2.' The UE may obtain cell measurements by averaging beam measurements that are above a suitable beam threshold 405 (beam Thresh), where the suitable beam threshold 405 may be indicated by the CHO configuration message (e.g., by the measurement configuration indicated by the CHO configuration message). In the example of FIG. 4, cell measurements of 'Target cell 1' and 'Target cell 2' may both satisfy CHO event-triggered criteria (e.g., one or more conditions) indicated by the CHO configuration message. For example, both 'Target cell 1' and 'Target cell 2' may satisfy an A3 trigger (e.g., target cell measurement>source cell measurement+offset), and may be candidates for the triggered CHO. As 'Target cell 1' includes more suitable candidate beams above the suitable beam threshold 405 (e.g., beams B4, B5, B6, and B7) than 'Target cell 2' (e.g., which has suitable candidate beams B8 and B9 above the suitable beam threshold 405, as well as an unsuitable candidate beam B10 below the suitable beam threshold 405), 'Target cell 1' may be selected for the CHO. A UE may then select a beam for random access preamble transmission to the base station associated with 'Target cell 1' according to the techniques described herein.

Beam measurement diagram 400 generally illustrates how a target cell (e.g., 'Target cell 1') is selected when multiple target cells satisfy handover condition(s) indicated by a CHO configuration. Target cells may be identified based on cell measurements performed by the UE (e.g., when a target cell measurement exceeds a source cell measurement by at least some offset), where the cell measurements and source cell measurement offset may be configured by a CHO configuration message. When more than one target cell satisfies HO conditions indicated by the CHO configuration message (e.g., when more than one target cell measurements exceed the source cell measurement by at least some offset), the UE may select a target cell based on a number of beams (e.g., beam measurements) above a suitable beam threshold 405 that are measured from the target cell. In some cases, a CHO configuration message may indicate a suitable beam threshold 405 that applies to the source cell and all target cells. In other cases, a CHO configuration message may indicate a suitable beam threshold 405 for each target cell, for a group of target cells, etc. (e.g., a CHO configuration message may indicate more than one suitable beam thresholds 405, which may apply to different target cells, the source cell, etc.).

A UE may thus perform measurements of beams of the source cell (e.g., 'Source cell') and target cells (e.g., 'Target cell 1' and 'Target cell 2'), and may derive cell measurements (e.g., of the Source cell,' 'Target cell 1,' and 'Target cell 2') from beam measurements. For example, from the beam measurements of each cell, a UE may utilize a beam consolidation/selection function that determines a cell measurement (e.g., a measurement of cell quality based on beam measurements corresponding to the cell). In some cases, the beam consolidation/selection function may be a linear average of beam measurements. In some cases, the network may configure all beams of a target cell are to be measured, or may indicate some subset of beams of a target cell are to be measured.

A measurement configuration (e.g., which may be included in the CHO configuration message) may indicate a set of beams (e.g., each beam associated with an SSB index or CSI-RS index) on which the UE should perform measurements. Parameters for deriving cell measurements from beam measurements may include an absolute threshold for the consolidation of measurement results per SSB (absThreshSS-BlocksConsolidation), a maximum number of beam measurements to average to derive cell measurements (nrofSS-BlocksToAverage), or other similar parameters, which may be included in the measurement configuration. A UE may perform measurements (e.g., RSRP measurements, RSRQ measurements, etc.) on the configured set of beams and derive cell measurements from the beam measurements (e.g., where the derived cell measurements may be used for evaluating CHO trigger criteria indicated by the CHO configuration message). In some cases, if the highest beam measurement value is less than or equal to absThreshSS-BlocksConsolidation, then a cell measurement may be set equal to the highest beam measurement value. Otherwise, a cell measurement may be derived as the average of highest beam measurement values greater than absThreshSS-BlocksConsolidation, where number of averaged beams is less than or equal to nrofSS-BlocksToAverage.

Figure 5:
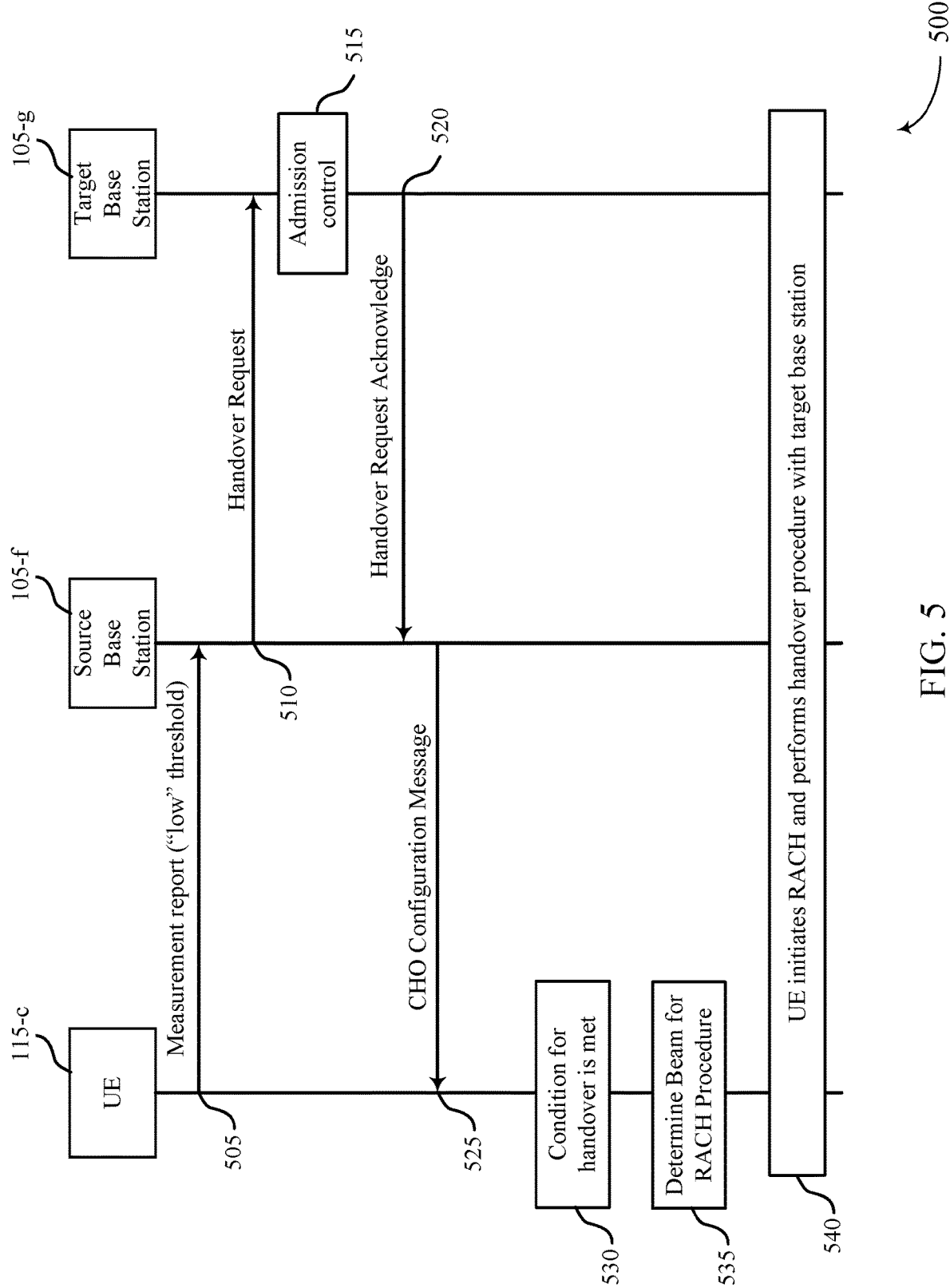
FIG. 5 illustrates an example of a process flow that supports beam selection for initiating random access during CHO execution in accordance with aspects of the present disclosure.

FIG. 5 illustrates an example of a process flow 500 that supports beam selection for initiating random access during CHO execution in accordance with aspects of the present disclosure. In some examples, process flow 500 may implement aspects of wireless communications system 100 and/or wireless communications system 200. The process flow in this example includes a UE 115-c, which may be an example of a UE described with reference to FIGS. 1 and 2; a source base station 105-f, and a target base station 105-g, which may be examples of base stations described with reference to FIGS. 1 and 2. The process flow 500 includes functions and communications implemented by UE 115-c and base stations 105-f, and 105-g in the context of CHO procedures.

In the following description of the process flow 500, the operations between UE 115-c and base station 105-f and 105-g may be transmitted in a different order than the order shown, or the operations may be performed in different orders or at different times. Certain operations may also be left out of the process flow 500, or other operations may be added to the process flow 500. It is to be understood that while base stations 105 and UE 115-c are shown performing a number of the operations of process flow 500, any wireless device may perform the operations shown.

At 505, the UE 115-c may transmit a measurement report to the source base station 105-f. The measurement report may include one or more channel measurements for the source base station 105-f, as well as measurements for one or more cells (e.g., neighboring base stations), which may include the target base station 105-g. The measurement report may be a "low" threshold measurement report, which may indicate that a channel measurement associated with the source base station 105-f is below a threshold value that is used to indicate that the source base station 105-f should configure a CHO for the UE 115-c.

At 510, the source base station 105-f may transmit a handover request to the target base station 105-g. While the example of FIG. 5 illustrates a single target base station 105-g, in other cases multiple different target base stations may be configured for CHO and the operations of FIG. 5 may be used for any number of target base stations. In some cases, the source base station 105-f may select the target base station 105-g for the handover request based on associated cell measurements from the measurement report of the UE 115-c (e.g., based on neighboring base station measurements that are above a threshold value or that are better than other of the neighboring base station measurements). In some cases, the handover request may include handover information associated with the UE 115-c.

At 515, the target base station 105-g may perform admission control responsive to receiving the handover request. The admission control may determine that resources may be reserved for the UE 115-c (e.g., a C-RNTI, CFRA resources, random access preamble, etc.). For example, in some cases, target base station 105-g may reserve CFRA resources (e.g., such as CFRA time-frequency resources, a CFRA preamble, a dedicated RACH preamble, etc.) for the UE 115-c to reduce latency associated with a random access procedure should CHO be triggered for the target base station 105-g. In other examples, target base station 105-g may not reserve CFRA resources for the UE 115-c (e.g., which may allow the target base station 105-g to allocate the CFRA resources to other devices).

At 520, the target base station 105-g may transmit a handover request acknowledgment to the source base station 105-f. The handover request acknowledgment may include information for use by the UE 115-c to establish a connection (e.g., any reserved CFRA time-frequency resources, random access preamble, C-RNTI, etc.) with the target base station 105-g. The source base station 105-f may receive the handover request acknowledgment, and determine CHO criteria for the target cell for use by the UE 115-c to trigger a CHO. The CHO criteria may include, for example, one or more measurement thresholds (e.g., measThreshHO TgNB) of the target base station 105-g (and for any other configured target base stations), the source base station 105-f, or any combinations thereof.

At 525, the source base station 105-f may transmit CHO configuration information to the UE 115-c (e.g., in a RRC reconfiguration message). In some cases, the CHO configuration message may indicate that the target base station 105-g is configured for CHO, may provide information for accessing the associated base stations 105 (e.g., random access information, C-RNTI, etc.), and may provide handover thresholds associated with each the target base station 105-g.

At 530, the UE 115-c may determine that the condition for handover is met. Such a determination may be made, for example, based on one or more channel quality measurements or target cell measurements by the UE 115-c that are compared to the CHO configuration provided by the source base station 105-f.

At 535, the UE 115-c may determine a selected beam for random access request transmission to the target base station 105-g (e.g., based on RACH configuration information included in the CHO configuration message). For example, UE 115-b may identify that the CHO configuration does not associate CFRA resources with any beam of the target cell (e.g., that the target base station 105-g did not reserve CFRA resources for the UE 115-c), compare each of a set of beam measurements of the target cell with the beam quality threshold, and identify one or more beams of the set of beams that satisfy the beam quality threshold. In some cases, the UE 115-c may select a highest quality beam with a highest quality beam measurement value (e.g., with a highest RSRP measurement, a highest RSRQ measurement, etc.) of the identified one or more beams as the selected beam. In some cases, the UE 115-b may select a beam with an earliest configured CBRA time-frequency resource of the identified one or more beams as the selected beam.

In examples where target base station 105-g does reserve CFRA resources for the UE 115-c (e.g., in examples where the CHO configuration message indicates a set of beams of the target cell configured with CFRA resources), the UE 115-c may compare each of a set of beam measurements of the target cell with the beam quality threshold, identify that none of the set of beams satisfy the beam quality threshold, but that one or more beams of the set of beams are within the beam quality threshold offset (e.g., included in the CHO configuration message) from the beam quality threshold, and select, as the selected beam, either a first beam having an earliest configured CFRA time-frequency resource or a second beam having an earliest configured CBRA time-frequency resource based on whether any of the set of beams have CFRA resources configured, where the random access request is transmitted as part of either a CBRA procedure or a CFRA procedure, based on whether the selected beam is configured with CFRA resources or CBRA resources.

At 540, the UE 115-c may initiate a RACH procedure with the first target base station 105-d and perform the handover procedure with the target base station 105-g. For example, the UE 115-c may transmit, based on the selected beam of the target cell, a random access request to the target cell (e.g., to target base station 105-d) to initiate a random access procedure for the handover to the target cell.

Figure 6:
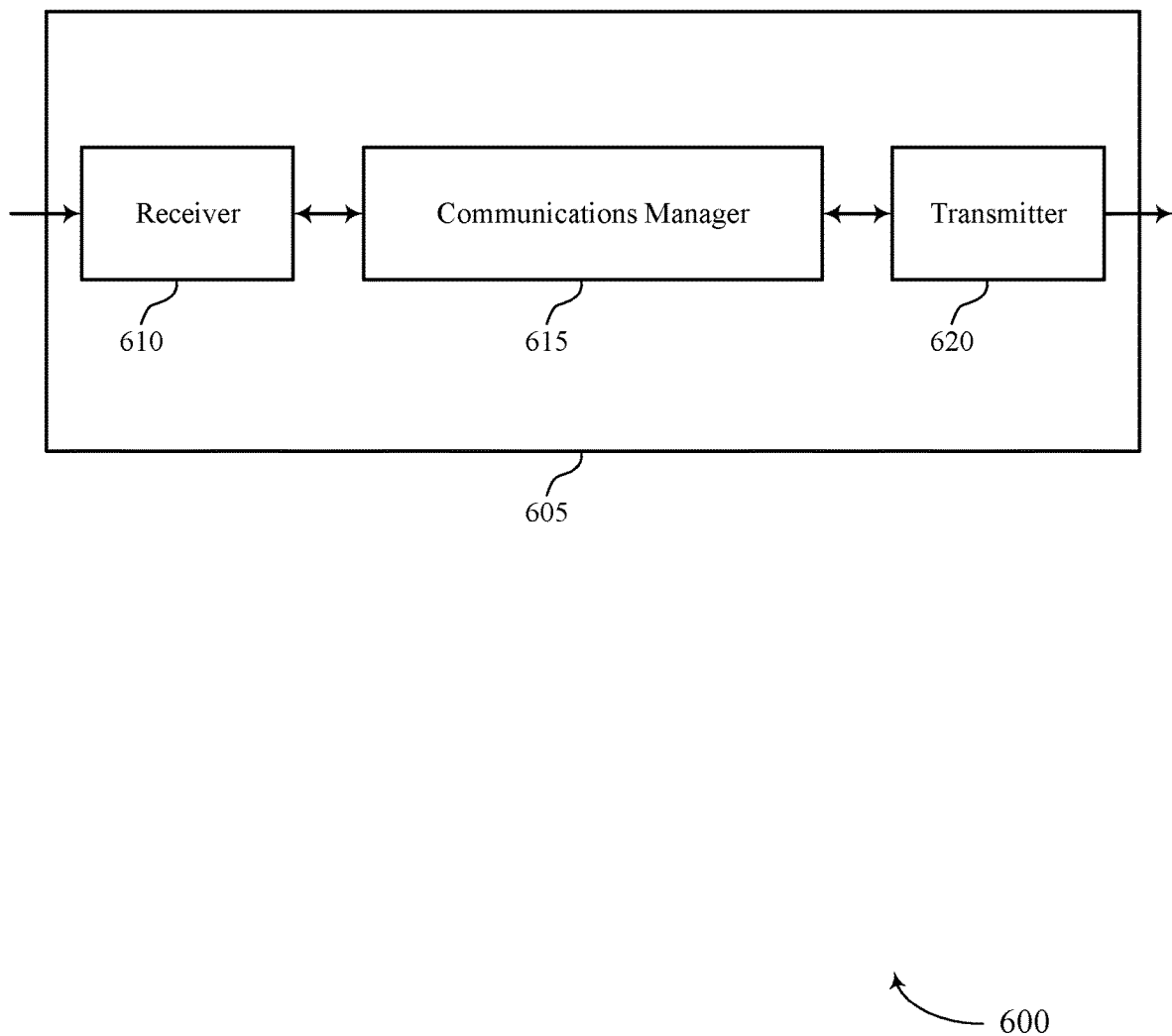
FIGS. 6 and 7 show block diagrams of devices that support beam selection for initiating random access during CHO execution in accordance with aspects of the present disclosure.

FIG. 6 shows a block diagram 600 of a device 605 that supports beam selection for initiating random access during CHO execution in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam selection for initiating random access during CHO execution, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a source base station, a conditional handover configuration indicative of a target cell for handover of the UE upon satisfaction of a condition, the conditional handover configuration also indicative of a beam quality threshold for a random access procedure by the UE on the target cell upon satisfaction of the condition. The communications manager 615 may initiate a handover procedure to the target cell based on satisfaction of the condition indicated by the conditional handover configuration. The communications manager 615 may determine, from a set of beam measurements of the target cell, a selected beam for a random access procedure on the target cell based on the beam quality threshold. The communications manager 615 may transmit, based on the selected beam of the target cell, a random access request to the target cell to initiate a random access procedure for the handover to the target cell. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
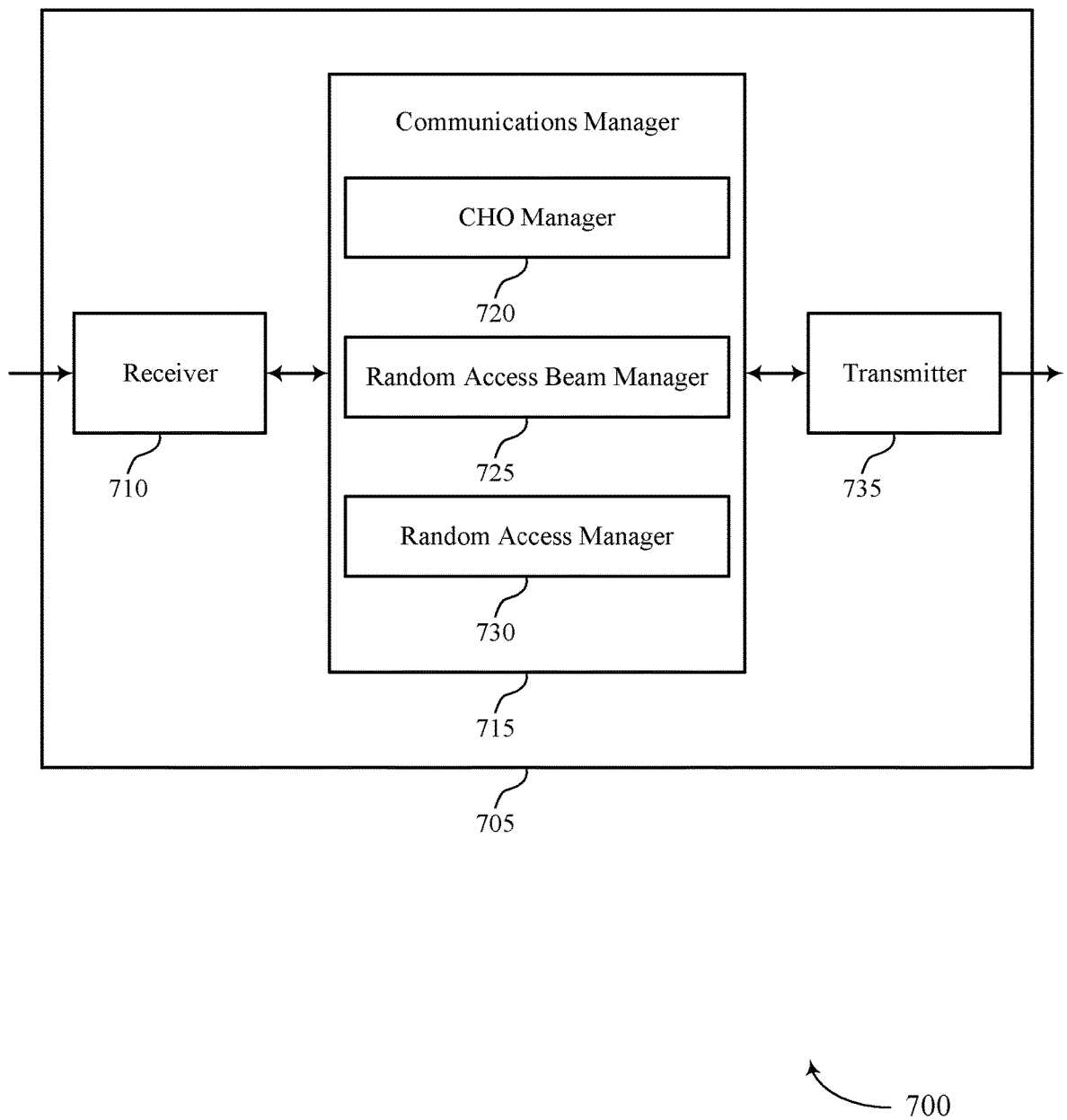

FIG. 7 shows a block diagram 700 of a device 705 that supports beam selection for initiating random access during CHO execution in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to beam selection for initiating random access during CHO execution, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CHO manager 720, a random access beam manager 725, and a random access manager 730. The communications manager 715 may be an example of aspects of the communications manager 910 described herein.

The CHO manager 720 may receive, from a source base station, a conditional handover configuration indicative of a target cell for handover of the UE upon satisfaction of a condition, the conditional handover configuration also indicative of a beam quality threshold for a random access procedure by the UE on the target cell upon satisfaction of the condition. The CHO manager 720 may initiate a handover procedure to the target cell based on satisfaction of the condition indicated by the conditional handover configuration.

The random access beam manager 725 may determine, from a set of beam measurements of the target cell, a selected beam for a random access procedure on the target cell based on the beam quality threshold.

The random access manager 730 may transmit, based on the selected beam of the target cell, a random access request to the target cell to initiate a random access procedure for the handover to the target cell.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
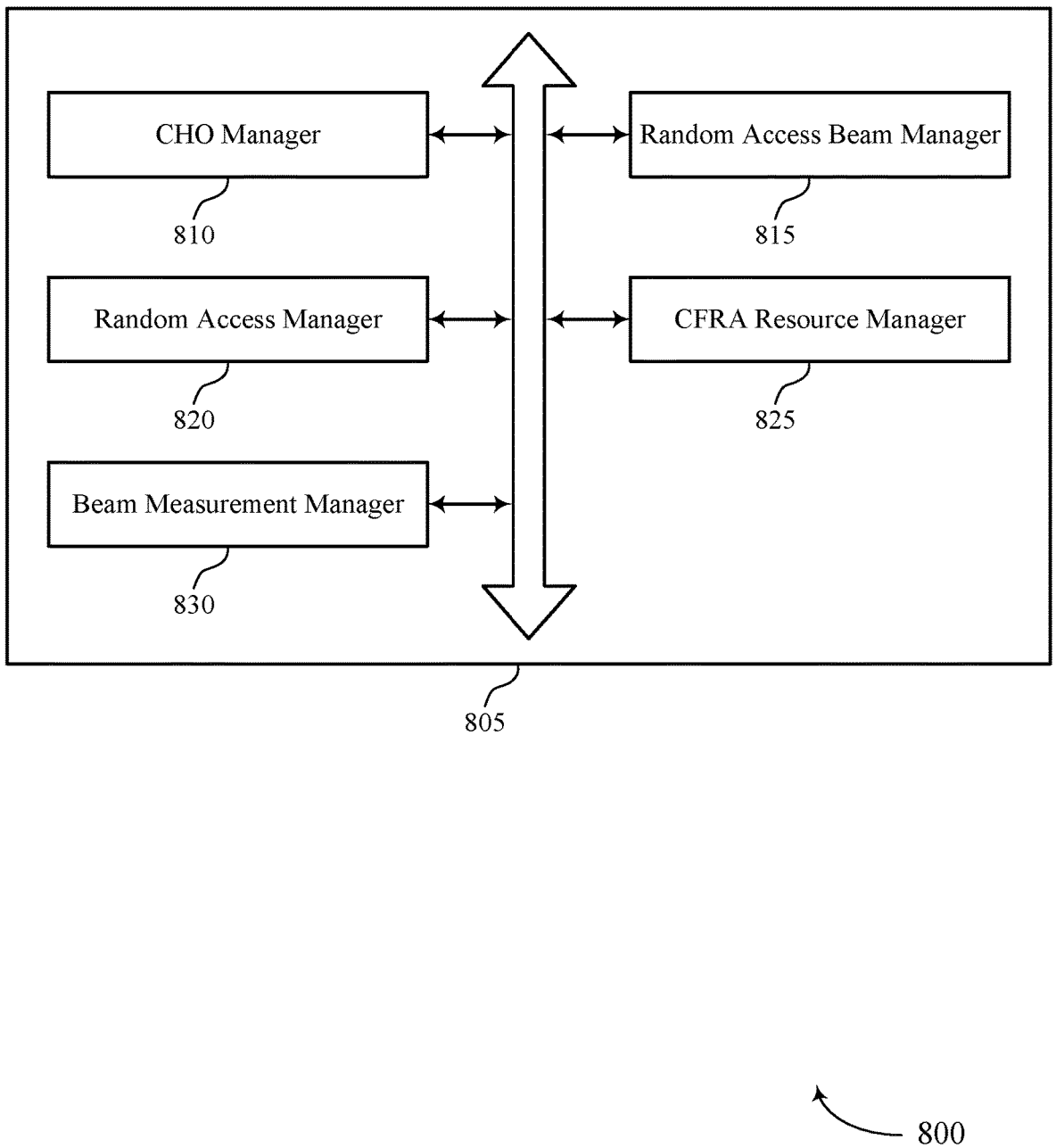
FIG. 8 shows a block diagram of a communications manager that supports beam selection for initiating random access during CHO execution in accordance with aspects of the present disclosure.

FIG. 8 shows a block diagram 800 of a communications manager 805 that supports beam selection for initiating random access during CHO execution in accordance with aspects of the present disclosure. The communications manager 805 may be an example of aspects of a communications manager 615, a communications manager 715, or a communications manager 910 described herein. The communications manager 805 may include a CHO manager 810, a random access beam manager 815, a random access manager 820, a CFRA resource manager 825, and a beam measurement manager 830. Each of these modules may communicate, directly or indirectly, with one another (e.g., via one or more buses).

The CHO manager 810 may receive, from a source base station, a conditional handover configuration indicative of a target cell for handover of the UE upon satisfaction of a condition, the conditional handover configuration also indicative of a beam quality threshold for a random access procedure by the UE on the target cell upon satisfaction of the condition. In some examples, the CHO manager 810 may initiate a handover procedure to the target cell based on satisfaction of the condition indicated by the conditional handover configuration. In some examples, the CHO manager 810 may identify that the conditional handover configuration further indicates a set of beams of the target cell configured with contention free random access resources. In some examples, the CHO manager 810 may identify that the conditional handover configuration further indicates a beam quality threshold offset for the target cell.

The random access beam manager 815 may determine, from a set of beam measurements of the target cell, a selected beam for a random access procedure on the target cell based on the beam quality threshold. In some examples, the random access beam manager 815 may identify one or more beams of the set of beams that satisfy the beam quality threshold. In some examples, the random access beam manager 815 may select a highest quality beam with a highest quality beam measurement value of the identified one or more beams as the selected beam. For example, the random access beam manager 815 may select a first beam of the identified one or more beams based at least in part on the first beam having a beam measurement value (e.g., a RSRP measurement or a RSRQ measurement) indicative of a beam quality higher than a beam measurement value of each of the other beams of the identified one or more beams. In some examples, the random access beam manager 815 may select a beam with an earliest configured contention based random access time-frequency resource as the selected beam. For example, the random access beam manager 815 may select a first beam of the identified one or more beams based at least in part on the first beam having a configured time-frequency resource earlier in the time domain of a frame or a plurality of sequential frames than a configured time-frequency resource of each of the other beams of the identified one or more beams. In some examples, the random access beam manager 815 may identify one or more beams of the set of beams that satisfy the beam quality threshold.

In some examples, the random access beam manager 815 may select a highest quality beam of the identified one or more beams as the selected beam, where the random access request is transmitted as part of a contention based random access procedure on the selected highest quality beam of the target cell. In some examples, the random access beam manager 815 may identify one or more beams of the set of beams that satisfy the beam quality threshold. In some examples, the random access beam manager 815 may select a highest quality beam of the identified one or more beams as the selected beam, regardless of whether the highest quality beam is among the set of beams configured with contention free random access resources, where the random access request is transmitted on the selected highest quality beam of the target cell as part of either a contention based random access procedure or a contention free random access procedure, based on whether the highest quality beam is among the set of beams configured with contention free random access resources.

In some examples, the random access beam manager 815 may select, as the selected beam, a highest quality beam of the identified one or more beams that is also among the set of beams configured with contention free random access resources, where the random access request is transmitted as part of a contention free random access procedure. In some examples, the random access beam manager 815 may identify that none of the set of beams satisfy the beam quality threshold, but that one or more beams of the set of beams are within the beam quality threshold offset from the beam quality threshold.

In some examples, the random access beam manager 815 may select a highest quality beam of the identified one or more beams as the selected beam, where the random access request is transmitted on the selected highest quality beam as part of a contention free random access procedure. In some examples, the random access beam manager 815 may identify that none of the set of beams satisfy the beam quality threshold, but that one or more beams of the set of beams are within the beam quality threshold offset from the beam quality threshold.

In some examples, the random access beam manager 815 may select, as the selected beam, either a first beam having an earliest configured contention free random access time-frequency resource or a second beam having an earliest configured contention based random access time-frequency resource based on whether any of the set of beams have contention free random access resources configured, where the random access request is transmitted as part of either a contention based random access procedure or a contention free random access procedure, based on whether the selected beam is configured with contention free random access resources or contention based random access resources.

The random access manager 820 may transmit, based on the selected beam of the target cell, a random access request to the target cell to initiate a random access procedure for the handover to the target cell. In some examples, the random access manager 820 may transmit the random access request as part of a contention based random access procedure.

The CFRA resource manager 825 may identify that the conditional handover configuration does not associate contention free random access resources with any beam of the target cell. In some examples, the CFRA resource manager 825 may identify that none of the one or more beams that satisfy the beam quality threshold are among the set of beams configured with contention free random access resources.

The beam measurement manager 830 may compare each of the set of beam measurements of the target cell with the beam quality threshold. In some examples, the beam measurement manager 830 may compare each of the set of beam measurements of the target cell with the beam quality threshold. In some examples, the beam measurement manager 830 may compare beam measurements of each of the set of beams of the target cell configured with contention free random access resources with the beam quality threshold.

Figure 9:
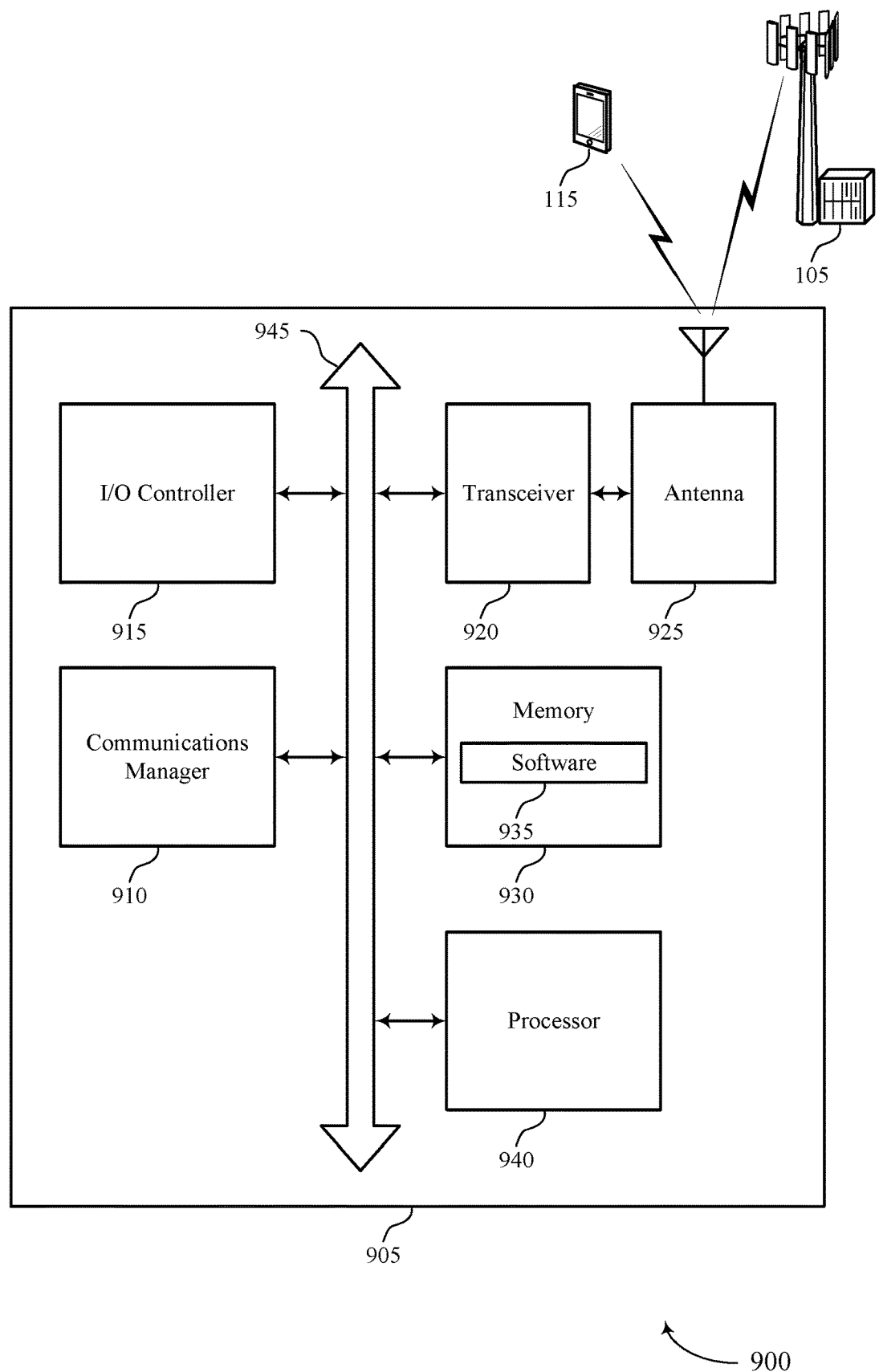
FIG. 9 shows a diagram of a system including a device that supports beam selection for initiating random access during CHO execution in accordance with aspects of the present disclosure.

FIG. 9 shows a diagram of a system 900 including a device 905 that supports beam selection for initiating random access during CHO execution in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus).

The communications manager 910 may receive, from a source base station, a conditional handover configuration indicative of a target cell for handover of the UE upon satisfaction of a condition, the conditional handover configuration also indicative of a beam quality threshold for a random access procedure by the UE on the target cell upon satisfaction of the condition. The communications manager 910 may initiate a handover procedure to the target cell based on satisfaction of the condition indicated by the conditional handover configuration. The communications manager 910 may determine, from a set of beam measurements of the target cell, a selected beam for a random access procedure on the target cell based on the beam quality threshold. The communications manager 910 may transmit, based on the selected beam of the target cell, a random access request to the target cell to initiate a random access procedure for the handover to the target cell.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code or software 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting Beam selection for initiating random access during CHO execution).

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
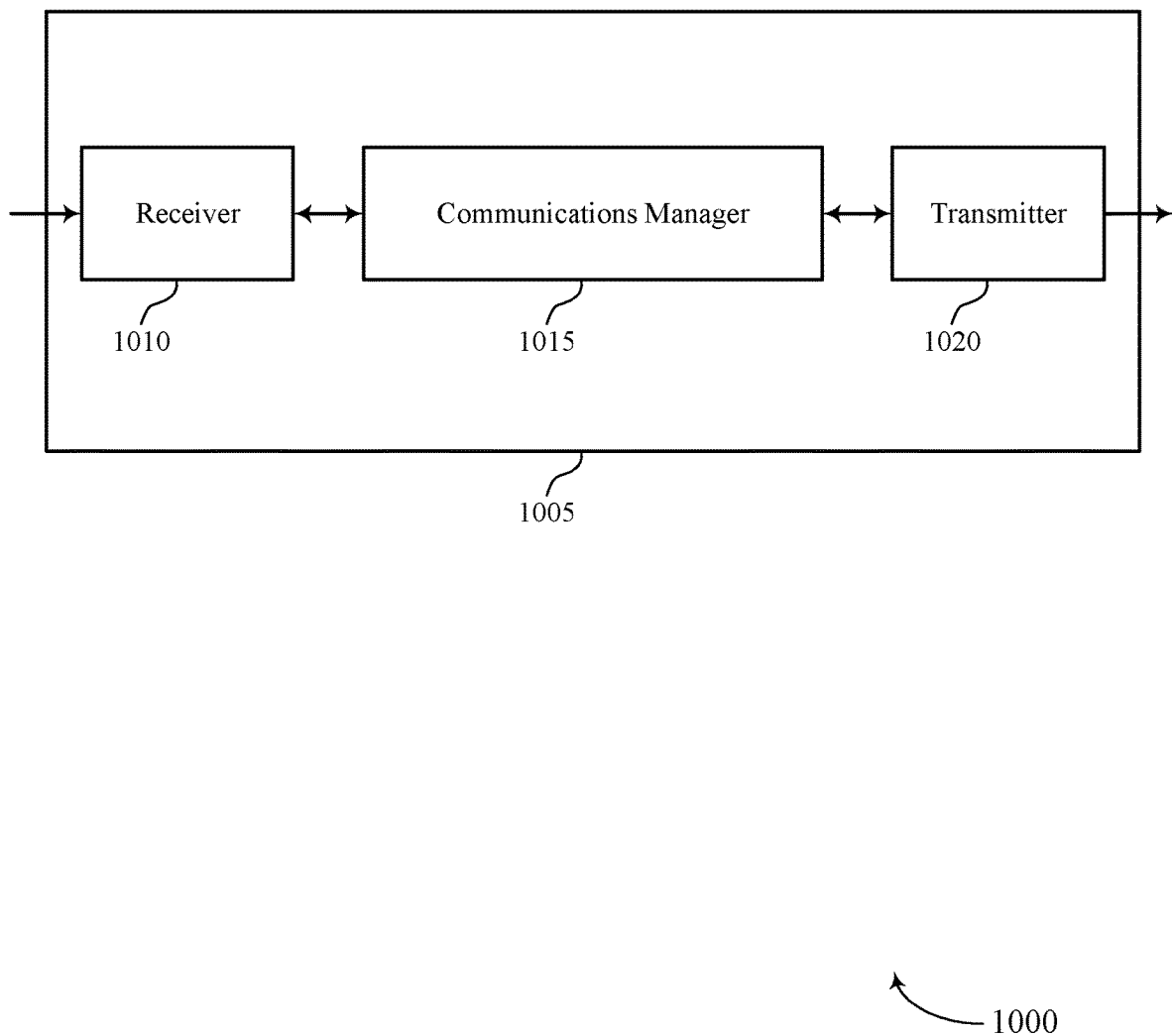
FIGS. 10 and 11 show block diagrams of devices that support beam selection for initiating random access during CHO execution in accordance with aspects of the present disclosure.

FIG. 10 shows a block diagram 1000 of a device 1005 that supports beam selection for initiating random access during CHO execution in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam selection for initiating random access during CHO execution, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, a cell measurement report indicative of a target cell. The communications manager 1015 may transmit, to the UE, a conditional handover configuration indicative of the target cell for handover of the UE upon satisfaction of a condition, the conditional handover configuration also indicative of a beam quality threshold for a random access procedure by the UE on the target cell. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
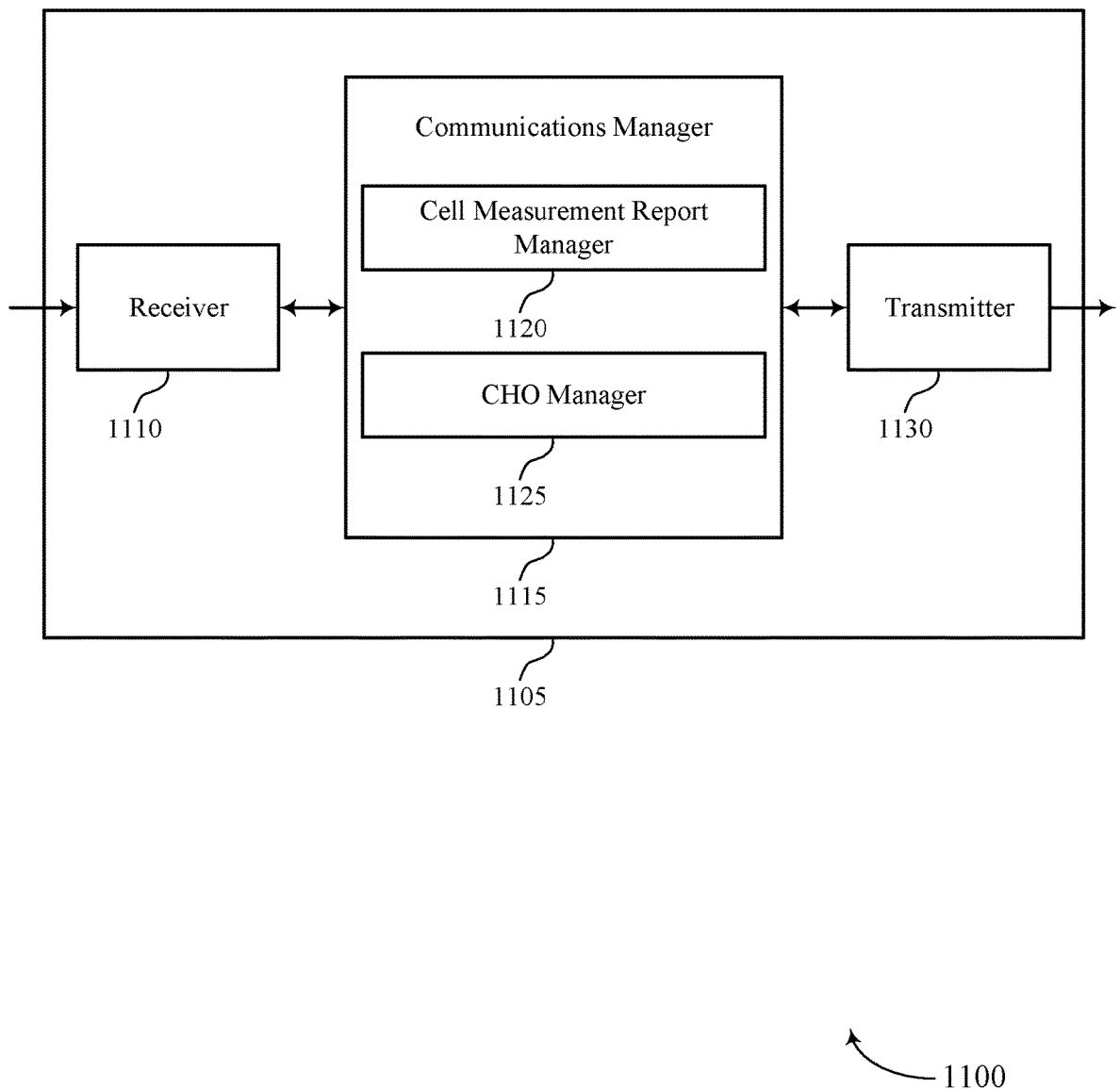

FIG. 11 shows a block diagram 1100 of a device 1105 that supports beam selection for initiating random access during CHO execution in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to beam selection for initiating random access during CHO execution, etc.). Information may be passed on to other components of the device 1105.

The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a cell measurement report manager 1120 and a CHO manager 1125. The communications manager 1115 may be an example of aspects of the communications manager 1310 described herein.

The cell measurement report manager 1120 may receive, from a UE, a cell measurement report indicative of a target cell.

The CHO manager 1125 may transmit, to the UE, a conditional handover configuration indicative of the target cell for handover of the UE upon satisfaction of a condition, the conditional handover configuration also indicative of a beam quality threshold for a random access procedure by the UE on the target cell.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
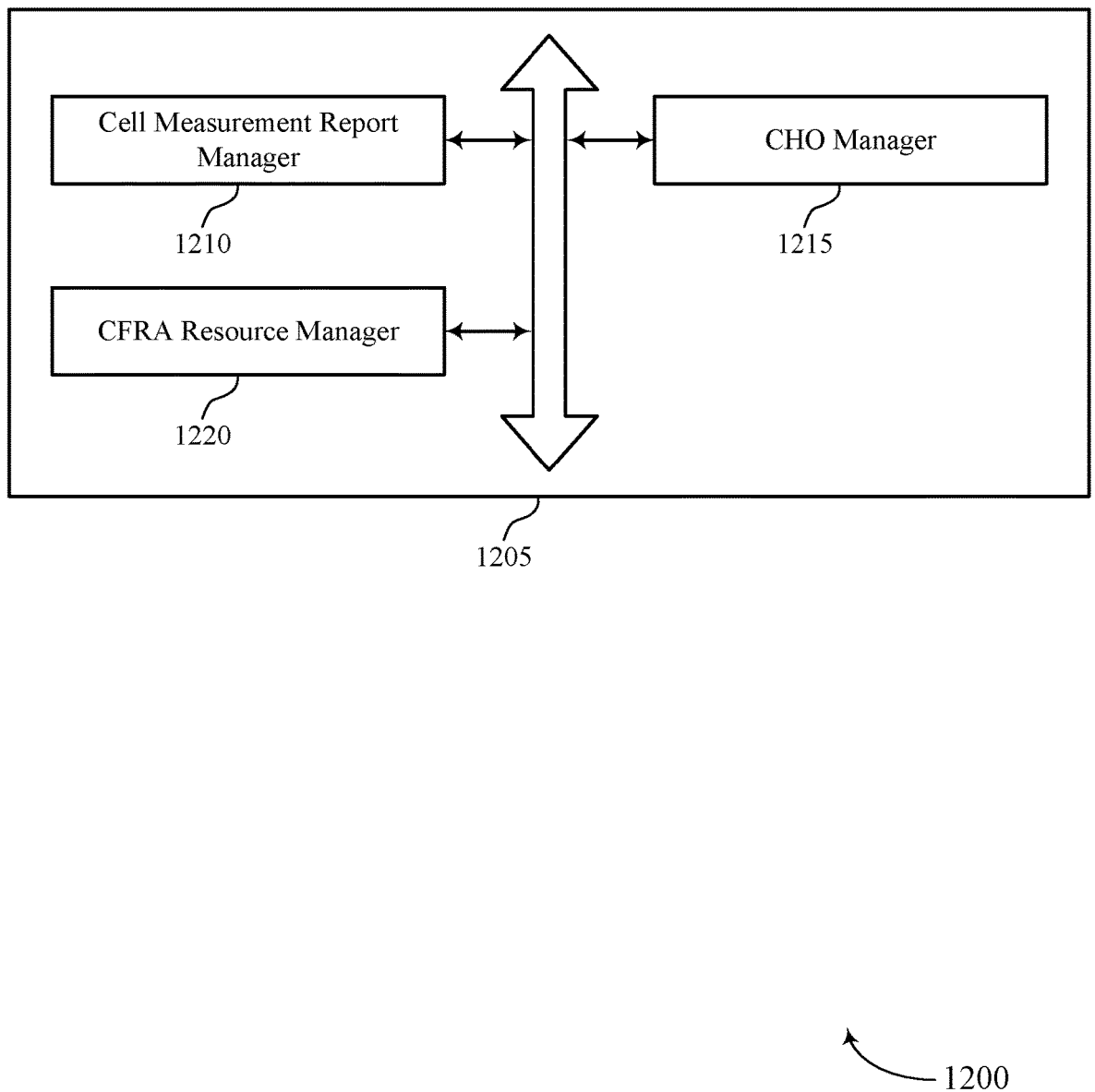
FIG. 12 shows a block diagram of a communications manager that supports beam selection for initiating random access during CHO execution in accordance with aspects of the present disclosure.

FIG. 12 shows a block diagram 1200 of a communications manager 1205 that supports beam selection for initiating random access during CHO execution in accordance with aspects of the present disclosure. The communications manager 1205 may be an example of aspects of a communications manager 1015, a communications manager 1115, or a communications manager 1310 described herein. The communications manager 1205 may include a cell measurement report manager 1210, a CHO manager 1215, and a CFRA resource manager 1220. Each of these modules may communicate, directly or indirectly, with one another (e.g., via one or more buses).

The cell measurement report manager 1210 may receive, from a UE, a cell measurement report indicative of a target cell.

The CHO manager 1215 may transmit, to the UE, a conditional handover configuration indicative of the target cell for handover of the UE upon satisfaction of a condition, the conditional handover configuration also indicative of a beam quality threshold for a random access procedure by the UE on the target cell. In some examples, the CHO manager 1215 may determine a beam quality threshold offset for the target cell, where the conditional handover configuration is also indicative of the beam quality threshold offset. In some examples, the CHO manager 1215 may determine the condition, the beam quality threshold, a beam quality threshold offset, or some combination thereof, based on the received cell measurement report, where the received cell measurement report is also indicative of one or more beam measurements corresponding to the target cell. In some cases, the beam quality threshold offset is determined based on the configured one or more contention free random access resources.

The CFRA resource manager 1220 may configure one or more contention free random access resources for each beam in a set of beams of the target cell, where the conditional handover configuration is also indicative of the set of beams of the target cell configured with the one or more contention free random access resources.

Figure 13:
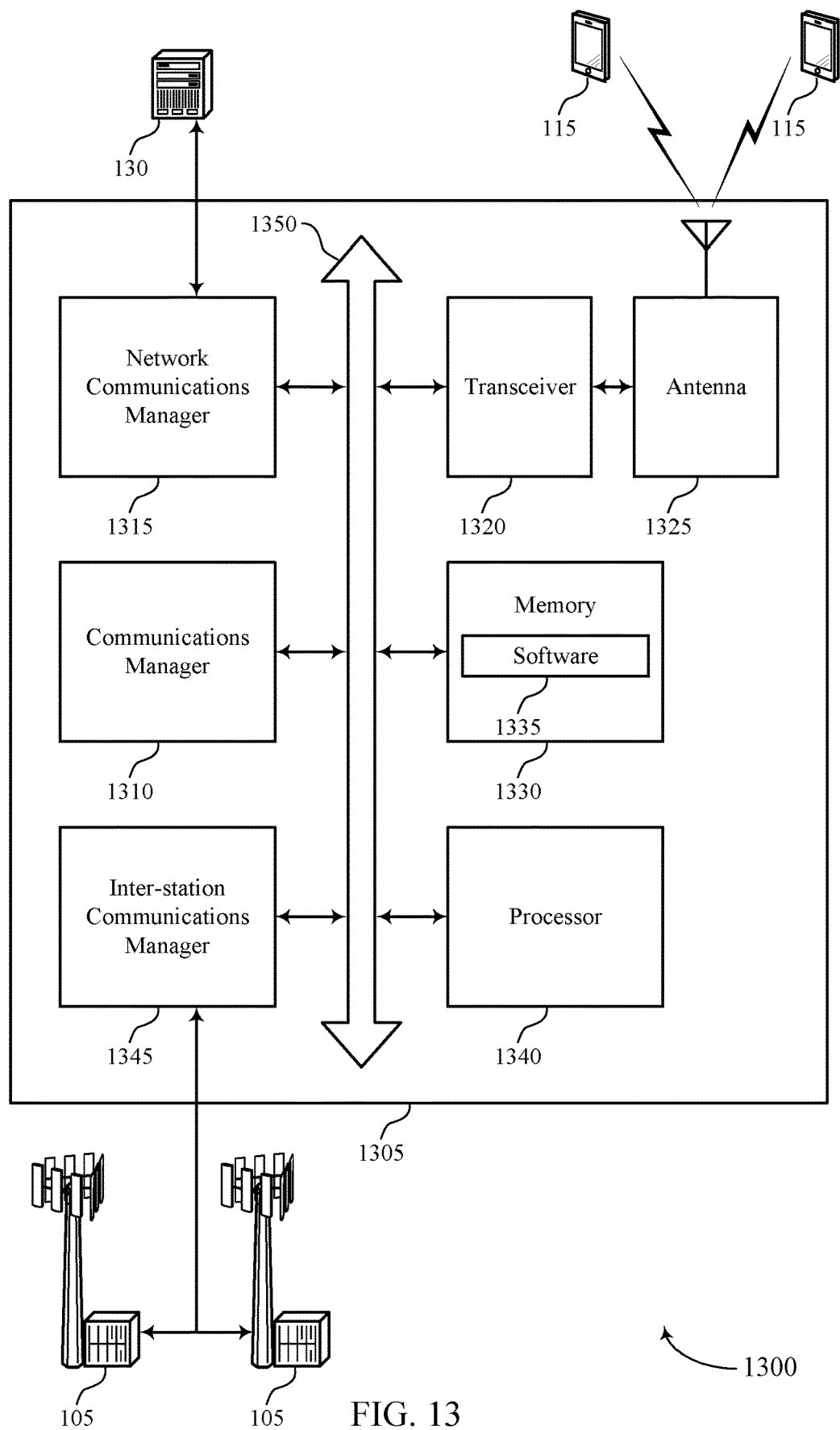
FIG. 13 shows a diagram of a system including a device that supports beam selection for initiating random access during CHO execution in accordance with aspects of the present disclosure.

FIG. 13 shows a diagram of a system 1300 including a device 1305 that supports beam selection for initiating random access during CHO execution in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, a cell measurement report indicative of a target cell and transmit, to the UE, a conditional handover configuration indicative of the target cell for handover of the UE upon satisfaction of a condition, the conditional handover configuration also indicative of a beam quality threshold for a random access procedure by the UE on the target cell.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam selection for initiating random access during CHO execution).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
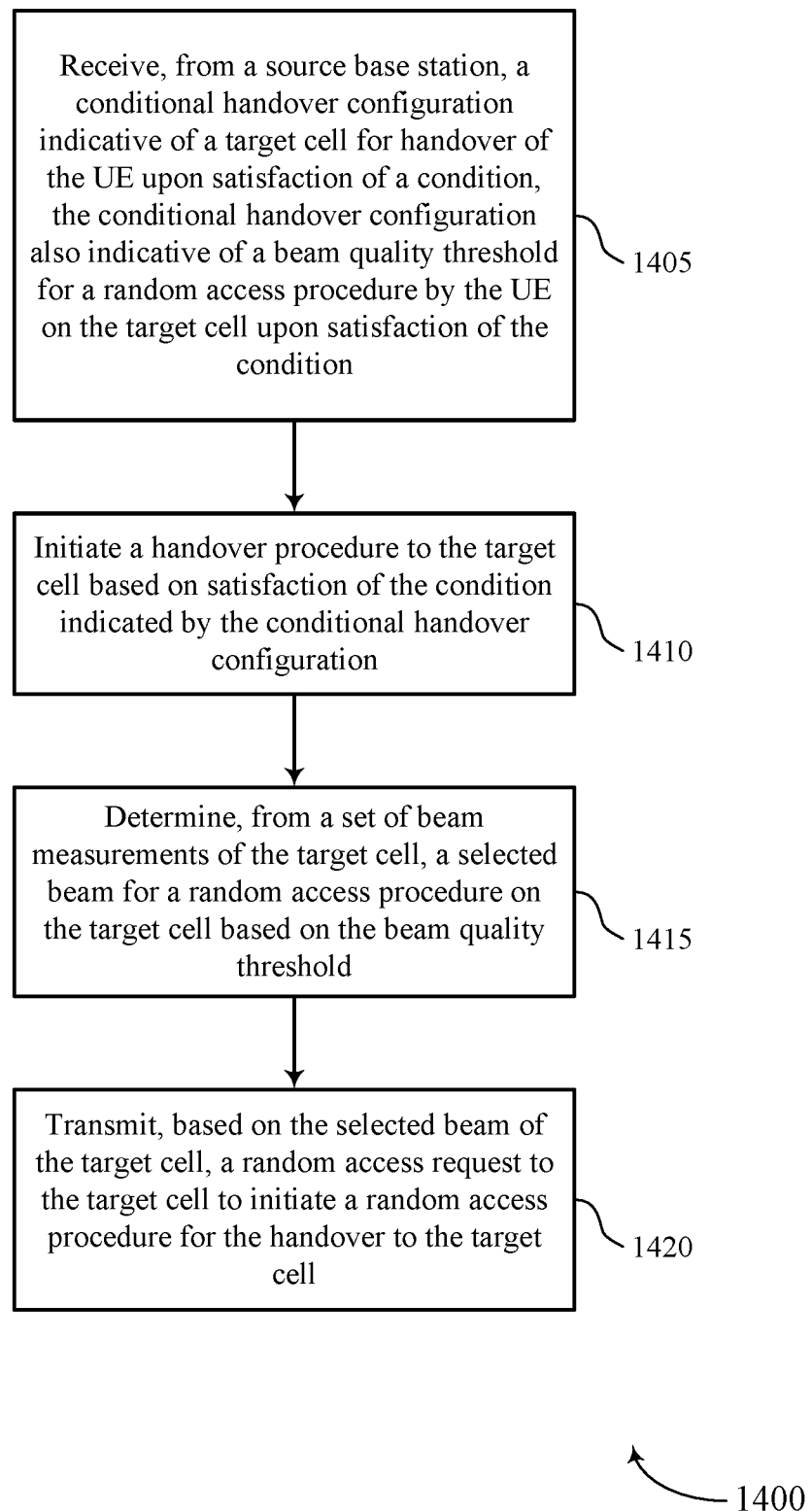
FIGS. 14 through 18 show flowcharts illustrating methods that support beam selection for initiating random access during CHO execution in accordance with aspects of the present disclosure.

FIG. 14 shows a flowchart illustrating a method 1400 that supports beam selection for initiating random access during CHO execution in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a source base station, a conditional handover configuration indicative of a target cell for handover of the UE upon satisfaction of a condition, the conditional handover configuration also indicative of a beam quality threshold for a random access procedure by the UE on the target cell upon satisfaction of the condition. The operations of 1405 may be performed according to the methods described herein. In some examples, aspects of the operations of 1405 may be performed by a CHO manager as described with reference to FIGS. 6 through 9.

At 1410, the UE may initiate a handover procedure to the target cell based on satisfaction of the condition indicated by the conditional handover configuration. The operations of 1410 may be performed according to the methods described herein. In some examples, aspects of the operations of 1410 may be performed by a CHO manager as described with reference to FIGS. 6 through 9.

At 1415, the UE may determine, from a set of beam measurements of the target cell, a selected beam for a random access procedure on the target cell based on the beam quality threshold. The operations of 1415 may be performed according to the methods described herein. In some examples, aspects of the operations of 1415 may be performed by a random access beam manager as described with reference to FIGS. 6 through 9.

At 1420, the UE may transmit, based on the selected beam of the target cell, a random access request to the target cell to initiate a random access procedure for the handover to the target cell. The operations of 1420 may be performed according to the methods described herein. In some examples, aspects of the operations of 1420 may be performed by a random access manager as described with reference to FIGS. 6 through 9.

Figure 15:
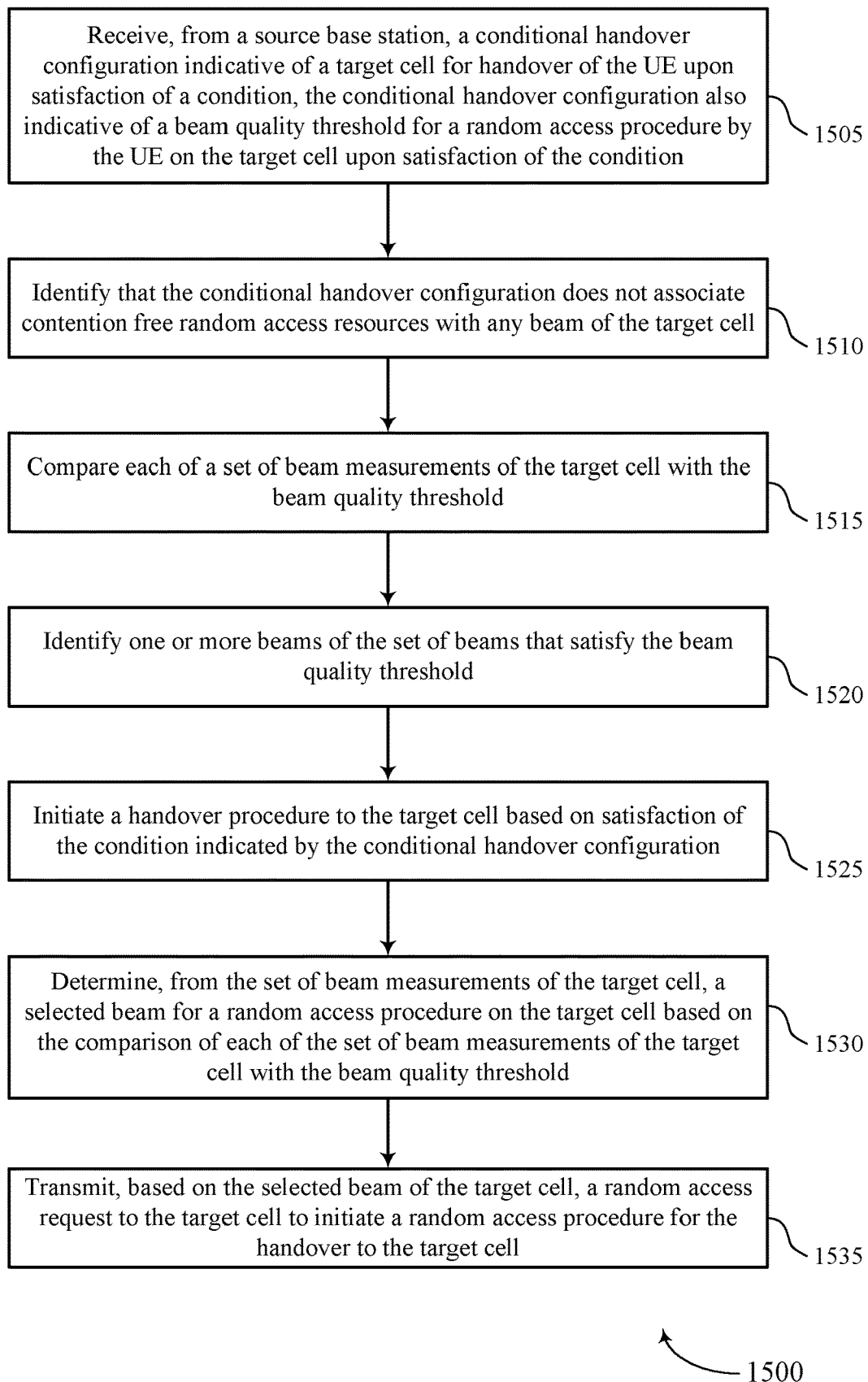

FIG. 15 shows a flowchart illustrating a method 1500 that supports beam selection for initiating random access during CHO execution in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a source base station, a conditional handover configuration indicative of a target cell for handover of the UE upon satisfaction of a condition, the conditional handover configuration also indicative of a beam quality threshold for a random access procedure by the UE on the target cell upon satisfaction of the condition. The operations of 1505 may be performed according to the methods described herein. In some examples, aspects of the operations of 1505 may be performed by a CHO manager as described with reference to FIGS. 6 through 9.

At 1510, the UE may identify that the conditional handover configuration does not associate contention free random access resources with any beam of the target cell. The operations of 1510 may be performed according to the methods described herein. In some examples, aspects of the operations of 1510 may be performed by a CFRA resource manager as described with reference to FIGS. 6 through 9.

At 1515, the UE may compare each of a set of beam measurements of the target cell with the beam quality threshold. The operations of 1515 may be performed according to the methods described herein. In some examples, aspects of the operations of 1515 may be performed by a beam measurement manager as described with reference to FIGS. 6 through 9.

At 1520, the UE may identify one or more beams of the set of beams that satisfy the beam quality threshold. The operations of 1520 may be performed according to the methods described herein. In some examples, aspects of the operations of 1520 may be performed by a random access beam manager as described with reference to FIGS. 6 through 9.

At 1525, the UE may initiate a handover procedure to the target cell based on satisfaction of the condition indicated by the conditional handover configuration. The operations of 1525 may be performed according to the methods described herein. In some examples, aspects of the operations of 1525 may be performed by a CHO manager as described with reference to FIGS. 6 through 9.

At 1530, the UE may determine, from the set of beam measurements of the target cell, a selected beam for a random access procedure on the target cell based on the comparison of each of the set of beam measurements of the target cell with the beam quality threshold. The operations of 1530 may be performed according to the methods described herein. In some examples, aspects of the operations of 1530 may be performed by a random access beam manager as described with reference to FIGS. 6 through 9.

At 1535, the UE may transmit, based on the selected beam of the target cell, a random access request to the target cell to initiate a random access procedure for the handover to the target cell. The operations of 1535 may be performed according to the methods described herein. In some examples, aspects of the operations of 1535 may be performed by a random access manager as described with reference to FIGS. 6 through 9.

Figure 16:
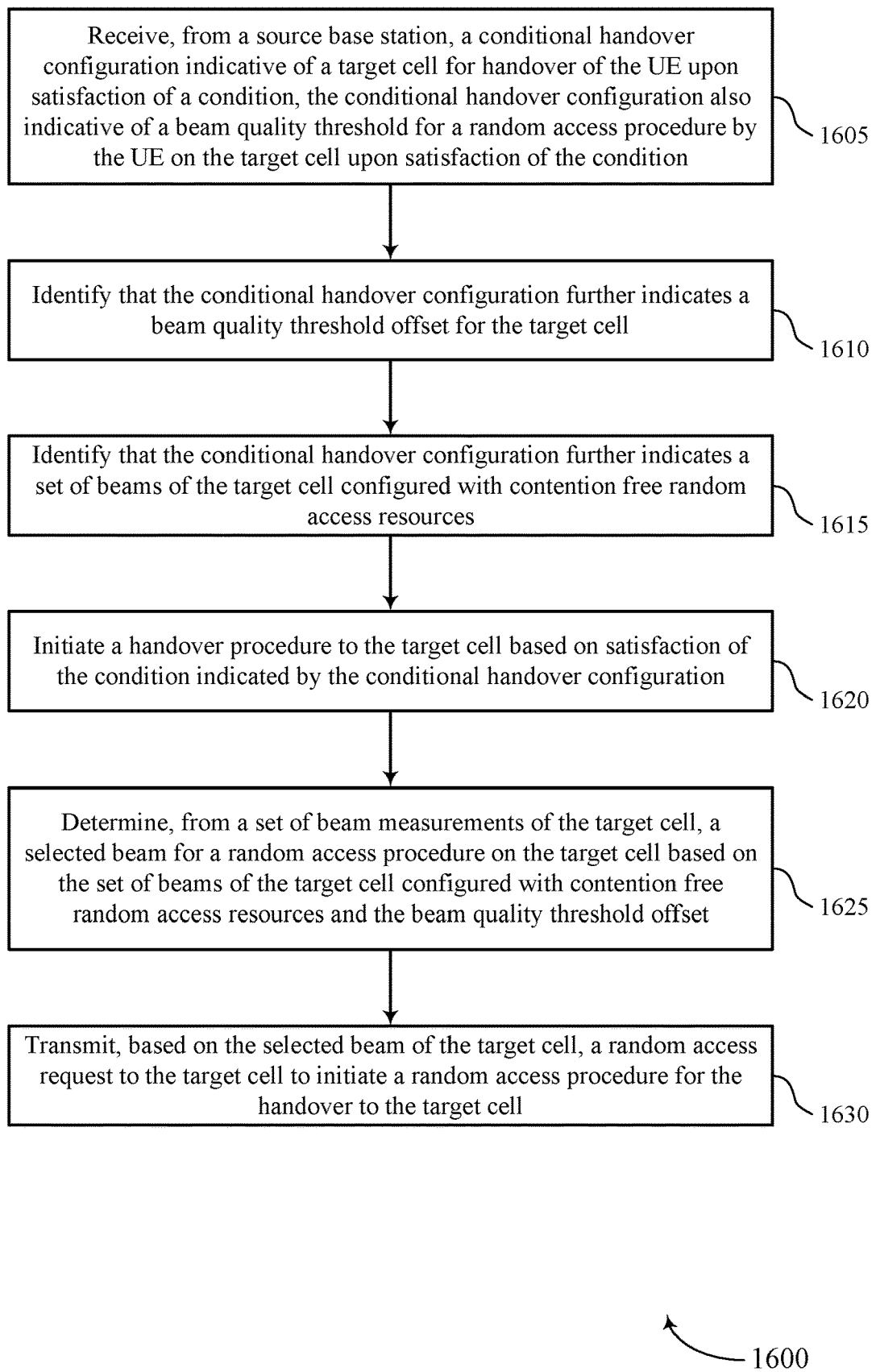

FIG. 16 shows a flowchart illustrating a method 1600 that supports beam selection for initiating random access during CHO execution in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a source base station, a conditional handover configuration indicative of a target cell for handover of the UE upon satisfaction of a condition, the conditional handover configuration also indicative of a beam quality threshold for a random access procedure by the UE on the target cell upon satisfaction of the condition. The operations of 1605 may be performed according to the methods described herein. In some examples, aspects of the operations of 1605 may be performed by a CHO manager as described with reference to FIGS. 6 through 9.

At 1610, the UE may identify that the conditional handover configuration further indicates a beam quality threshold offset for the target cell. The operations of 1610 may be performed according to the methods described herein. In some examples, aspects of the operations of 1610 may be performed by a CHO manager as described with reference to FIGS. 6 through 9.

At 1615, the UE may identify that the conditional handover configuration further indicates a set of beams of the target cell configured with contention free random access resources. The operations of 1615 may be performed according to the methods described herein. In some examples, aspects of the operations of 1615 may be performed by a CHO manager as described with reference to FIGS. 6 through 9.

At 1620, the UE may initiate a handover procedure to the target cell based on satisfaction of the condition indicated by the conditional handover configuration. The operations of 1620 may be performed according to the methods described herein. In some examples, aspects of the operations of 1620 may be performed by a CHO manager as described with reference to FIGS. 6 through 9.

At 1625, the UE may determine, from a set of beam measurements of the target cell, a selected beam for a random access procedure on the target cell based on the set of beams of the target cell configured with contention free random access resources and the beam quality threshold offset. The operations of 1625 may be performed according to the methods described herein. In some examples, aspects of the operations of 1625 may be performed by a random access beam manager as described with reference to FIGS. 6 through 9.

At 1630, the UE may transmit, based on the selected beam of the target cell, a random access request to the target cell to initiate a random access procedure for the handover to the target cell. The operations of 1630 may be performed according to the methods described herein. In some examples, aspects of the operations of 1630 may be performed by a random access manager as described with reference to FIGS. 6 through 9.

Figure 17:
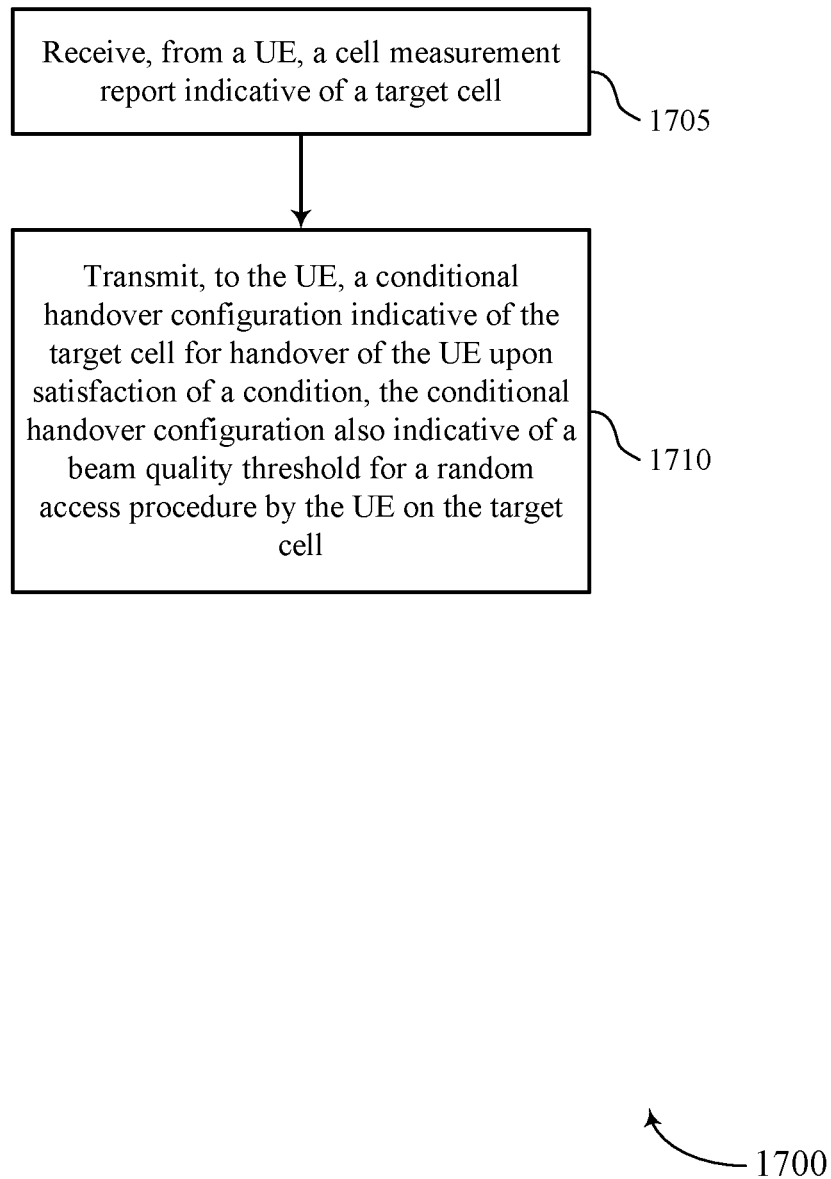

FIG. 17 shows a flowchart illustrating a method 1700 that supports beam selection for initiating random access during CHO execution in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, a cell measurement report indicative of a target cell. The operations of 1705 may be performed according to the methods described herein. In some examples, aspects of the operations of 1705 may be performed by a cell measurement report manager as described with reference to FIGS. 10 through 13.

At 1710, the base station may transmit, to the UE, a conditional handover configuration indicative of the target cell for handover of the UE upon satisfaction of a condition, the conditional handover configuration also indicative of a beam quality threshold for a random access procedure by the UE on the target cell. The operations of 1710 may be performed according to the methods described herein. In some examples, aspects of the operations of 1710 may be performed by a CHO manager as described with reference to FIGS. 10 through 13.

Figure 18:
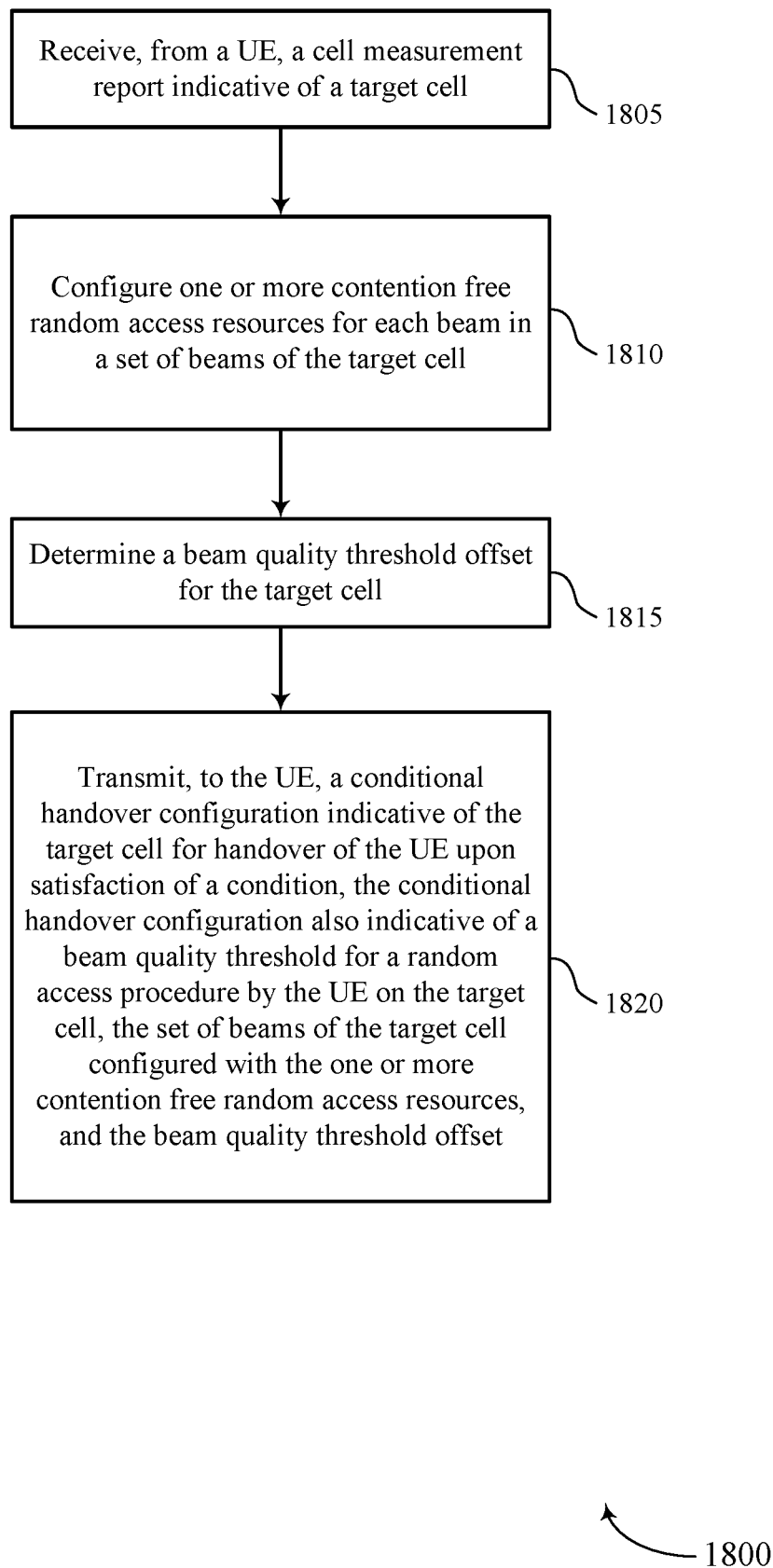

FIG. 18 shows a flowchart illustrating a method 1800 that supports beam selection for initiating random access during CHO execution in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, a cell measurement report indicative of a target cell. The operations of 1805 may be performed according to the methods described herein. In some examples, aspects of the operations of 1805 may be performed by a cell measurement report manager as described with reference to FIGS. 10 through 13.

At 1810, the base station may configure one or more contention free random access resources for each beam in a set of beams of the target cell. The operations of 1810 may be performed according to the methods described herein. In some examples, aspects of the operations of 1810 may be performed by a CFRA resource manager as described with reference to FIGS. 10 through 13.

At 1815, the base station may determine a beam quality threshold offset for the target cell (e.g., based on the one or more configured contention free random access resources, cell measurements of the cell measurement report received from the UE, etc.). The operations of 1815 may be performed according to the methods described herein. In some examples, aspects of the operations of 1815 may be performed by a CHO manager as described with reference to FIGS. 10 through 13.

At 1820, the base station may transmit, to the UE, a conditional handover configuration indicative of the target cell for handover of the UE upon satisfaction of a condition, the conditional handover configuration also indicative of a beam quality threshold for a random access procedure by the UE on the target cell, the set of beams of the target cell configured with the one or more contention free random access resources, and the beam quality threshold offset. The operations of 1820 may be performed according to the methods described herein. In some examples, aspects of the operations of 1820 may be performed by a CHO manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a source network entity, a conditional handover configuration indicative of a target cell for handover of the UE upon satisfaction of a condition, the conditional handover configuration also indicative of a beam quality threshold for a random access procedure on the target cell upon satisfaction of the condition;
    initiating a handover procedure to the target cell based at least in part on satisfaction of the condition indicated by the conditional handover configuration;
    determining, from a plurality of beam measurements of the target cell, at least two beams of the target cell that satisfy the beam quality threshold;
    selecting a beam from the at least two beams for the random access procedure on the target cell based at least in part on a highest beam measurement result value of the at least two beams and an earliest configured random access time-frequency resource of the at least two beams; and
    transmitting, based at least in part on the selected beam of the target cell, a random access request to the target cell to initiate the random access procedure on the target cell for the handover of the UE.

2. The method of claim 1, wherein determining the selected beam for the random access procedure comprises:
    identifying that the conditional handover configuration does not associate contention free random access resources with any beam of the target cell; and
    comparing each of the plurality of beam measurements of the target cell with the beam quality threshold.

3. The method of claim 2, wherein transmitting the random access request to the target cell comprises:
    transmitting the random access request as part of a contention based random access procedure.

4. The method of claim 1, further comprising:
    identifying that the conditional handover configuration further indicates a set of beams of the target cell configured with contention free random access resources, the random access time-frequency resource comprising the contention free random access resources.

5. The method of claim 4, wherein selecting the beam from the at least two beams for the random access procedure comprises:
    comparing each of the plurality of beam measurements of the target cell with the beam quality threshold;
    identifying that none of the at least two beams that satisfy the beam quality threshold are among the set of beams of the target cell configured with contention free random access resources; and
    selecting a highest quality beam of the at least two beams that satisfy the beam quality threshold as the selected beam,
    wherein the random access request is transmitted as part of a contention based random access procedure on the selected highest quality beam of the target cell.

6. The method of claim 4, wherein selecting the beam from the at least two beams for the random access procedure comprises:
    comparing each of the plurality of beam measurements of the target cell with the beam quality threshold; and
    selecting a highest quality beam of the at least two beams that satisfy the beam quality threshold as the selected beam, regardless of whether the highest quality beam is among the set of beams of the target cell configured with contention free random access resources,
    wherein the random access request is transmitted on the selected highest quality beam of the target cell as part of either a contention based random access procedure or a contention free random access procedure, based at least in part on whether the highest quality beam is among the set of beams configured with contention free random access resources.

7. The method of claim 4, wherein selecting the beam from the at least two beams for the random access procedure comprises:
comparing each of the plurality of beam measurements of the target cell with the beam quality threshold; and
selecting, as the selected beam, a highest quality beam of the at least two beams that satisfy the beam quality threshold and that is also among the set of beams of the target cell configured with contention free random access resources,
wherein the random access request is transmitted as part of a contention free random access procedure.

8. The method of claim 4, further comprising:
identifying that the conditional handover configuration further indicates a beam quality threshold offset for the target cell.

9. The method of claim 8, further comprising:
comparing beam measurements of each of a second set of beams of the target cell configured with contention free random access resources with the beam quality threshold, the second set of beams corresponding to a subsequent random access procedure, the random access time-frequency resource comprising the contention free random access resources;
identifying that none of the second set of beams satisfy the beam quality threshold, but that one or more beams of the second set of beams are within the beam quality threshold offset from the beam quality threshold; and
selecting a highest quality beam of the one or more beams as a selected second beam,
wherein a second random access request is transmitted on the selected highest quality beam as part of a contention free random access procedure.

10. The method of claim 1, further comprising:
identifying that the conditional handover configuration further indicates a beam quality threshold offset for the target cell;
comparing each of a second plurality of beam measurements of the target cell with the beam quality threshold;
identifying that none of a second plurality of beams satisfy the beam quality threshold, but that one or more beams of the second plurality of beams are within the beam quality threshold offset from the beam quality threshold; and
selecting either a first beam of the second plurality of beams having an earliest configured contention free random access time-frequency resource or a second beam of the second plurality of beams having an earliest configured contention based random access time-frequency resource, the selecting being based at least in part on whether any of the second plurality of beams have contention free random access resources configured, the random access time-frequency resource comprising the contention free random access time-frequency resource and the contention based random access time-frequency resource,
wherein a second random access request is transmitted as part of either a contention based random access procedure or a contention free random access procedure, based at least in part on whether the first beam configured with contention free random access resources or the second beam configured with contention based random access resources is selected.

11. A method for wireless communication at a source network entity, comprising:
receiving, from a user equipment (UE), a cell measurement report indicative of a target cell; and
transmitting, to the UE, a conditional handover configuration indicative of the target cell for handover of the UE upon satisfaction of a condition, the conditional handover configuration also indicative of a beam quality threshold and a beam quality threshold offset below the beam quality threshold corresponding to one or more contention free random access resources for a random access procedure by the UE on the target cell.

12. The method of claim 11, further comprising:
configuring the one or more contention free random access resources for each beam in a set of beams of the target cell, wherein the conditional handover configuration is also indicative of the set of beams of the target cell configured with the one or more contention free random access resources.

13. The method of claim 12, wherein the conditional handover configuration is also indicative of the beam quality threshold offset.

14. The method of claim 11, further comprising:
determining the condition, the beam quality threshold, a beam quality threshold offset, or some combination thereof, based at least in part on the received cell measurement report, wherein the received cell measurement report is also indicative of one or more beam measurements corresponding to the target cell.

15. An apparatus for wireless communication at a user equipment (UE), comprising:
a processor; and
memory coupled with the processor, with instructions stored in the memory, the instructions being executable by the processor to cause the apparatus to:
receive, from a source network entity, a conditional handover configuration indicative of a target cell for handover of the UE upon satisfaction of a condition, the conditional handover configuration also indicative of a beam quality threshold for a random access procedure on the target cell upon satisfaction of the condition;
initiate a handover procedure to the target cell based at least in part on satisfaction of the condition indicated by the conditional handover configuration;
determine, from a plurality of beam measurements of the target cell, at least two beams of the target cell that satisfy the beam quality threshold;
select a beam from the at least two beams for the random access procedure on the target cell based at least in part on a highest beam measurement result value of the at least two beams and an earliest configured random access time-frequency resource of the at least two beams; and
transmit, based at least in part on the selected beam of the target cell, a random access request to the target cell to initiate the random access procedure on the target cell for the handover of the UE.

16. The apparatus of claim 15, wherein the instructions to determine the selected beam for the random access procedure are executable by the processor to cause the apparatus to:
identify that the conditional handover configuration does not associate contention free random access resources with any beam of the target cell; and
compare each of the plurality of beam measurements of the target cell with the beam quality threshold.

17. The apparatus of claim 16, wherein the instructions to transmit the random access request to the target cell are executable by the processor to cause the apparatus to:
transmit the random access request as part of a contention based random access procedure.

18. The apparatus of claim 15, wherein the instructions are further executable by the processor to cause the apparatus to:
identify that the conditional handover configuration further indicates a set of beams of the target cell configured with contention free random access resources, the random access time-frequency resource comprising the contention free random access resources.

19. The apparatus of claim 18, wherein the instructions to select the beam from the at least two beams for the random access procedure are executable by the processor to cause the apparatus to:
compare each of the plurality of beam measurements of the target cell with the beam quality threshold;
identify that none of the at least two beams that satisfy the beam quality threshold are among the set of beams of the target cell configured with contention free random access resources; and
select a highest quality beam of the at least two beams that satisfy the beam quality threshold as the selected beam, wherein the random access request is transmitted as part of a contention based random access procedure on the selected highest quality beam of the target cell.

20. The apparatus of claim 18, wherein the instructions to select the beam from the at least two beams for the random access procedure are executable by the processor to cause the apparatus to:
compare each of the plurality of beam measurements of the target cell with the beam quality threshold; and
select a highest quality beam of the at least two beams that satisfy the beam quality threshold as the selected beam, regardless of whether the highest quality beam is among the set of beams of the target cell configured with contention free random access resources,
wherein the random access request is transmitted on the selected highest quality beam of the target cell as part of either a contention based random access procedure or a contention free random access procedure, based at least in part on whether the highest quality beam is among the set of beams configured with contention free random access resources.

21. The apparatus of claim 18, wherein the instructions to select the beam from the at least two beams for the random access procedure are executable by the processor to cause the apparatus to:
compare each of the plurality of beam measurements of the target cell with the beam quality threshold; and
select, as the selected beam, a highest quality beam of the at least two beams that satisfy the beam quality threshold and that is also among the set of beams of the target cell configured with contention free random access resources, wherein the random access request is transmitted as part of a contention free random access procedure.

22. The apparatus of claim 18, wherein the instructions are further executable by the processor to cause the apparatus to:
identify that the conditional handover configuration further indicates a beam quality threshold offset for the target cell.

23. The apparatus of claim 22, wherein the instructions are further executable by the processor to cause the apparatus to:
compare beam measurements of each of a second set of beams of the target cell configured with contention free random access resources with the beam quality threshold, the second set of beams corresponding to a subsequent random access procedure, the random access time-frequency resource comprising the contention free random access resources;
identify that none of the second set of beams satisfy the beam quality threshold, but that one or more beams of the second set of beams are within the beam quality threshold offset from the beam quality threshold; and
select a highest quality beam of the one or more beams as a selected second beam, wherein the random access request is transmitted on the selected highest quality beam as part of a contention free random access procedure.

24. The apparatus of claim 15, wherein the instructions are further executable by the processor to cause the apparatus to:
identify that the conditional handover configuration further indicates a beam quality threshold offset for the target cell;
compare each of a second plurality of beam measurements of the target cell with the beam quality threshold;
identify that none of a second plurality of beams satisfy the beam quality threshold, but that one or more beams of the second plurality of beams are within the beam quality threshold offset from the beam quality threshold; and
select either a first beam of the second plurality of beams having an earliest configured contention free random access time-frequency resource or a second beam of the second plurality of beams having an earliest configured contention based random access time-frequency resource, based at least in part on whether any of the plurality of second beams have contention free random access resources configured, the random access time-frequency resource comprising the contention free random access time-frequency resource and the contention based random access time-frequency resource,
wherein a second random access request is transmitted as part of either a contention based random access procedure or a contention free random access procedure, based at least in part on whether the first beam configured with contention free random access resources or the second beam configured with contention based random access resources is selected.

25. An apparatus for wireless communication at a source network entity, comprising:
a processor; and
memory coupled with the processor, with instructions stored in the memory, the instructions being executable by the processor to cause the apparatus to:
receive, from a user equipment (UE), a cell measurement report indicative of a target cell; and
transmit, to the UE, a conditional handover configuration indicative of the target cell for handover of the UE upon satisfaction of a condition, the conditional handover configuration also indicative of a beam quality threshold and a beam quality threshold offset below the beam quality threshold corresponding to one or more contention free random access resources for a random access procedure by the UE on the target cell.

26. The apparatus of claim 25, wherein the instructions are further executable by the processor to cause the apparatus to:
configure the one or more contention free random access resources for each beam in a set of beams of the target cell, wherein the conditional handover configuration is also indicative of the set of beams of the target cell configured with the one or more contention free random access resources.

27. The apparatus of claim 26, wherein the conditional handover configuration is also indicative of the beam quality threshold offset.

28. The apparatus of claim 25, wherein the instructions are further executable by the processor to cause the apparatus to:
determine the condition, the beam quality threshold, a beam quality threshold offset, or some combination thereof, based at least in part on the received cell measurement report, wherein the received cell measurement report is also indicative of one or more beam measurements corresponding to the target cell.

29. An apparatus for wireless communication at a user equipment (UE), comprising:
means for receiving, from a source network entity, a conditional handover configuration indicative of a target cell for handover of the UE upon satisfaction of a condition, the conditional handover configuration also indicative of a beam quality threshold for a random access procedure on the target cell upon satisfaction of the condition;
means for initiating a handover procedure to the target cell based at least in part on satisfaction of the condition indicated by the conditional handover configuration;
means for determining, from a plurality of beam measurements of the target cell, at least two beams of the target cell that satisfy the beam quality threshold;
means for selecting a beam from the at least two beams for the random access procedure on the target cell based at least in part on a highest beam measurement result value of the at least two beams and an earliest configured random access time-frequency resource of the at least two beams; and
means for transmitting, based at least in part on the selected beam of the target cell, a random access request to the target cell to initiate the random access procedure on the target cell for the handover of the UE.

30. An apparatus for wireless communication at a source network entity, comprising:
means for receiving, from a user equipment (UE), a cell measurement report indicative of a target cell; and
means for transmitting, to the UE, a conditional handover configuration indicative of the target cell for handover of the UE upon satisfaction of a condition, the conditional handover configuration also indicative of a beam quality threshold condition, the conditional handover configuration also indicative of a beam quality threshold and a beam quality threshold offset below the beam quality threshold corresponding to one or more contention free random access resources for a random access procedure by the UE on the target cell.

31. A non-transitory computer-readable medium storing code for wireless communication at a user equipment (UE), the code comprising instructions executable by a processor to:
receive, from a source network entity, a conditional handover configuration indicative of a target cell for handover of the UE upon satisfaction of a condition, the conditional handover configuration also indicative of a beam quality threshold for a random access procedure on the target cell upon satisfaction of the condition;
initiate a handover procedure to the target cell based at least in part on satisfaction of the condition indicated by the conditional handover configuration;
determine, from a plurality of beam measurements of the target cell, at least two beams of the target cell that satisfy the beam quality threshold;
select a beam from the at least two beams for the random access procedure on the target cell based at least in part on a highest beam measurement result value of the at least two beams and an earliest configured random access time-frequency resource of the at least two beams; and
transmit, based at least in part on the selected beam of the target cell, a random access request to the target cell to initiate the random access procedure on the target cell for the handover of the UE.

32. A non-transitory computer-readable medium storing code for wireless communication at a source network entity, the code comprising instructions executable by a processor to:
receive, from a user equipment (UE), a cell measurement report indicative of a target cell; and
transmit, to the UE, a conditional handover configuration indicative of the target cell for handover of the UE upon satisfaction of a condition, the conditional handover configuration also indicative of a beam quality threshold condition, the conditional handover configuration also indicative of a beam quality threshold and a beam quality threshold offset below the beam quality threshold corresponding to one or more contention free random access resources for a random access procedure by the UE on the target cell.

* * * * *